United States Patent

Ota

Patent Number: 5,194,960
Date of Patent: Mar. 16, 1993

[54] OPTICAL IMAGE SIGNAL CONTROL DEVICE

[75] Inventor: Yoshitaka Ota, Tokyo, Japan

[73] Assignee: Konica Corporation, Tokyo, Japan

[21] Appl. No.: 660,867

[22] Filed: Feb. 26, 1991

[30] Foreign Application Priority Data

Mar. 5, 1990 [JP] Japan .................................. 2-52992
Mar. 5, 1990 [JP] Japan .................................. 2-52993
Mar. 5, 1990 [JP] Japan .................................. 2-52995

[51] Int. Cl.⁵ .......................................... H04H 5/238
[52] U.S. Cl. ............................... 358/228; 358/213.19
[58] Field of Search ............... 358/209, 213.19, 228, 358/909, 165, 170; 250/229, 201.1, 201.2, 201.4, 210.5

[56] References Cited

U.S. PATENT DOCUMENTS

4,963,980 10/1990 Suga et al. ............................ 358/209
5,036,400  6/1991 Haruki .................................. 358/228

FOREIGN PATENT DOCUMENTS

0269053   6/1988 European Pat. Off. .............. 5/238
63-193772 8/1988 Japan ................................... 5/335
2-134986  5/1990 Japan ................................... 5/238
2-134991  5/1990 Japan ................................... 5/335
02149076  6/1990 Japan ................................... 5/235
2-250472 10/1990 Japan .

Primary Examiner—Herbert Goldstein
Assistant Examiner—Tuan V. Ho
Attorney, Agent, or Firm—Finnegan, Henderson, Farabow, Garrett and Dunner

[57] ABSTRACT

In an exposure control mechanism for a camera, and more particularly for a still video camera which obtains an image signal using an image sensor, a first preliminary exposure is conducted with almost all the center portion of an automatic exposure luminance range exposed to light of the most suitable exposure level. The specific number of pixels obtained through this exposure is limited to within the foregoing middle luminance range. However, since the total number of pixels are known, the total number of pixels saturated with image pick-up signals due to high exposure intensity in the portion recognized as white, and the total number of pixels in the portion recognized as black due to low exposure intensity, can be obtained by distribution data of pixels in an image pick-up screen with regard to the luminance level obtained by the first preliminary exposure. From the numbers of pixels in the portion recognized as white and in the portion recognized as black, the luminance information of the entire image pick-up screen, and rough information about the luminance distribution, are obtained, and a second preliminary exposure condition can be determined based upon the obtained information. Consequently, metering can be completed when preliminary exposure has been conducted twice.

5 Claims, 26 Drawing Sheets (b)

(a)

OPTICAL IMAGE SIGNAL CONTROL DEVICE

BACKGROUND OF THE INVENTION

The present invention relates to an exposure control mechanism for a camera, and more particularly relates to an exposure control mechanism for a still video camera which obtains an image signal using a solid image sensor and records the image signal onto a floppy disk.

There are various kinds of exposure control mechanisms for cameras. In the case of silver halide photography, the most common exposure control mechanism is provided with a photometry sensor in order to conduct photometry.

In the case of a still video camera, negative feedback control is generally conducted in such a manner that: the output signal of an image pickup element is integrated; when the integrated value is small, the iris is opened; and when the integrated value is large, the iris is stopped down.

The inventors have already proposed an exposure control mechanism (which was disclosed in the official gazette in Japanese Patent Application No. 70409/1989) which is characterized in that: pixels are sorted according to their luminance; a histogram is made according to the number of pixels; and the most appropriate exposure conditions are determined according to the histogram.

The exposure control mechanism described above, which uses an exclusive photometry sensor, can not conduct exposure control of high accuracy because the sensitivity of the sensor and image sensor is varied.

In the case of the exposure control mechanism in which an exposure is controlled by a negative feedback control circuit using an image pick-up signal, the iris is gradually changed according to the integrated value of an image pick-up signal. Therefore, the following problem is caused: it takes a long time to adjust the iris, so that photographic opportunities may be missed.

The exposure control mechanism proposed by the inventors enables a photographer to catch all photographic opportunities, so that the mechanism is suitable for practical use.

The inventors have investigated the measures to improve the performance of a camera. As a result, the following problems have been clarified.

When investigating camera performance, the inventors ascertained that: when the pixels on an image screen are sorted according to the levels of luminance in order to make a luminance histogram, the histogram is made across the entire luminance range in which an exposure can be conducted, so that exposure must be conducted 3 to 4 times, and as a result it takes a long time to perform the photometry, and thus the response ability is lowered.

The reason why a plurality of exposures are needed is as follows: the range (the AE interlocking range) of luminance in the luminance histogram is usually spread from 7 to 18 Lv (Light value), so that a plurality of exposures of various exposure conditions are necessary in order to obtain the data of pixel distribution of the entire luminance range.

The following control method is conventionally used for an automatic exposure control (which will be called AE in this specification hereinafter) of a video camera: the iris and exposure time are controlled so that the averaged value of the integrated luminance signal level of the whole screen is proper.

Other than the method described above, various automatic exposure control methods have been developed such as: a method in which the data obtained from the center of the image screen is weighted; and a method in which an image screen is divided into a plurality of areas and the luminance signal level is integrated in each area.

Further, the conventional exposure control methods have the following problems: when the detected luminance belongs to an evaluated luminance range, consideration is not given to whether the pixel is on the high luminance region or in the low luminance region; and part of the obtained data, in the form of a histogram, is not utilized when the data is not in the range of the main photographic object.

As a result, the following problems occur, which will be explained as follows referring to the drawings.

The problem which is caused when all the data in a luminance range is equally treated will be explained as follows, with reference to the drawings.

For example, the case will be considered in which a histogram illustrated in FIG. 11 is obtained by preliminary exposure.

The width (the elemental luminance range) of the stripe shown in the histogram is set to 0.5 Lv in order to maintain the accuracy of the histogram. The width of the evaluation luminance range which is used as the reference to judge the luminance distribution, is set to 2 Lv. The numbers of pixels of four elemental luminance ranges located in the range of 2 Lv are added, and the sum is used as an evaluation value. The exposure conditions are determined according to the luminance range, the evaluated value of which is the highest. The reason why the width of the evaluation luminance range is set to 2 Lv, is as follows: an ordinary photographic object usually has a fairly wide luminance range, and therefore it is necessary to evaluate the luminance with the range of 2 Lv.

In the case of the histogram illustrated in FIG. 11, when evaluation is performed with the range of 2 Lv (in other words, the evaluation luminance range is 2 Lv), the evaluation value becomes highest in the range of 9 to 11 Lv. In this case, photographing is performed under the exposure condition (i.e. exposure condition A) in which the image pick-up signal of 11 Lv, which is the maximum luminance in this luminance range, can be 100%.

However, when exposure control is conducted in the manner described above, adequate exposure can not be obtained in the primary portion of the image, the luminance of which is in the range of 8 to 10 Lv, so that the obtained image becomes dark, which is not desirable. In this case, it is preferable to expose the image according to the luminance range of 8 to 10 Lv, in other words to control the exposure according to exposure condition of B. Even though the image of which the luminance range is 10 to 11 Lv becomes too bright, it is preferable to give an adequate exposure to the primary portion of the image, the luminance range of which is 9 to 10 Lv. In some cases, the most suitable exposure conditions can not be selected in the manner explained above.

The problem which occurs when the luminance information of other luminance ranges is not used, will be explained as follows.

For example, the case is considered in which the luminance histogram illustrated in FIG. 14 is obtained by a preliminary photographing. When an evaluation is performed with the range of 2 Lv, the maximum evaluation value can be obtained in the range of 8 to 10 Lv and photographing is conducted under the exposure condition of C. In the photographing described above, the signal level of the primary portion of the photographic object becomes adequate. However, although there are numerous picture elements in the luminance range of not less than 10 Lv, all of the portion of luminance which is more than 10 Lv becomes white, so that the area of the white portion becomes very large. Accordingly, the averaged luminance level of the image on a TV screen becomes abnormally high, which gives a bad impression. As explained above, even though the signal level of the primary photographic object is the most suitable, appropriate exposure can not be given to the image as a whole.

Further, there is a problem which will be described as follows: when exposure control is conducted according to information obtained by averaged overall photometry and by weighted averaged central photometry, normal exposure can not be obtained under the condition of excessively bright background lighting.

In order to cope with the situation described above, a camera having the following characteristics has come onto the market: when a photographer has judged that a normal exposure will not be obtained due to the condition of a photographic object, a corrected exposure can be conducted by a special function provided to the camera.

In this case exposure correction is conducted in such a manner that: the exposure values obtained by AE (an automatic exposure control mechanism) are corrected by adding, for example +0.5 EV, +1 EV, −0.5 EV and −1 EV.

In the case where exposure is controlled according to the information obtained by a multi-divided brightness metering such as an evaluation metering or a multi-pattern metering, the camera automatically detects photographing conditions such as bright background light, and a predetermined exposure correction is conducted according to a predetermined algorithm.

In the conventional exposure correction systems explained above, a photographer can easily comprehend the characteristics of the averaged overall metering system and the center-weighted metering system, so that when the photographer judges that he can not attain a proper exposure, for example when he takes a photograph of a landscape and a setting sun, focusing on the setting sun, he is aware that the subject will be taken in silhouette, and he can take the photograph under a roughly corrected condition.

However, in the methods described above, it is difficult to obtain an accurate correction value. Consequently, when the photographer desires an image of accurate exposure, he must take several photographs under various conditions, in other words, he must conduct bracketing, which takes time and costs much labor.

When exposure is controlled with evaluation metering or multi-pattern metering, a tentative correction can be automatically conducted according to the obtained information. However, due to the bias and accuracy of information, and due to the composition of the control algorithm, the range of correction is limited. Therefore, in some cases a wrong exposure correction is conducted, which leads to a failure of photographing.

When the photographer tries to avoid the problems described above, it is difficult for him to take proper measures against the problems because the control algorithm is sophisticated. As described above, the reliability of automatic exposure correction is limited and it is difficult for a photographer to correct the exposure conditions according to his skill. Accordingly, in the case where an accurate exposure is necessary, there are problems which can not be solved by conventional technology.

SUMMARY OF THE INVENTION

With a view of the situation described above, it is a primary object of the present invention to provide an exposure control mechanism of a camera which is capable of metering with high accuracy and quick response.

Another object of the present invention is to conduct correct exposure control.

A further object of the present invention is to provide an automatic correction mechanism of a camera which is characterized in that: a photographer can easily judge whether a correct exposure can be automatically obtained with regard to a desired object or not; and when the photographer wants to correct the exposure, exposure correction can be automatically conducted by the mechanism.

The exposure control mechanism of a camera of the present invention comprises: an image sensor; an exposure regulating means which regulates the exposure of the above-described image sensor; an exposure control means which controls the motion of the above-described exposure regulating means; and a luminance information obtaining means which obtains the luminance information of an image pick-up screen according to a luminance signal obtained from the above-described image sensor. In the above-described exposure control mechanism of a camera of the present invention, exposure control is conducted as follows: the above-described exposure control means controls the above-described exposure regulating means so that the exposure can be adjusted to the middle of the luminance range in which exposure control can be conducted, and the first preliminary exposure is conducted; the above-described luminance obtaining means obtains the distribution data of pixels in the image pick-up screen with regard to the luminance level according to the luminance signal obtained by the above-described first preliminary exposure; the amounts of pixels in the portion recognized as white and the portion recognized as black are respectively found according to the above-described distribution data of pixels, and the amounts found in the manner described above are sent to the above-described exposure control means; according to the sent distribution data, the above-described exposure control means controls the above-described exposure regulating means and conducts exposure until the amounts of the portion recognized as white and the portion recognized as black become smaller than a predetermined value; when the amounts of the portion recognized as white and the portion recognized as black become smaller than the above-described predetermined value, the exposure operation is completed even though the luminance information is not obtained with regard to the entire luminance range in which exposure can be controlled; and the above-described exposure regulating means is controlled to conduct the final exposure control so that the luminance of the luminance range in which the evaluated value made according to the data obtained at the end of exposure is large, can become the most suitable signal level.

The exposure control means obtains the information of luminance of the photographic object from signals sent from optical sensors, such as a distance measuring sensor or an automatic white balance sensor, provided for purposes other than automatic exposure control. Then, the obtained information is compared with a predetermined reference value, and when it is judged that the luminance of the photographic object is higher than the reference value, exposure is conducted in such a manner that the exposure is reduced with regard to the exposure corresponding to the reference value. When it is judged that the luminance of the photographic object is lower than the reference value, exposure is conducted in such a manner that the exposure is increased with regard to the exposure corresponding to the reference value.

When AE range is 7 to 18 Lv, at least 3 exposures are necessary in order to make a complete luminance histogram. However, when the luminance information of almost all pixels on the screen can be obtained and a luminance histogram of the level higher than a predetermined level can be made, a suitable exposure control can be sufficiently conducted. In other words, the information of the entire luminance range is not necessarily required. When the total number of the pixels of which information can not be obtained is not more than a predetermined value, exposure control can be satisfactorily conducted.

From the viewpoint described above, the first preliminary exposure is conducted in an example of the present invention in such a manner that almost all the middle of the AE luminance range is exposed to light of the most proper level. The specific number of pixels can be obtained by this exposure only in the above-described middle luminance range. However, the total number of pixels are known, so that the total number of the pixels in the portion recognized as white and that of the pixels in the portion recognized as black can be known, wherein the total number of pixels in the portion recognized as white is defined as the total number of pixels which are saturated with image pick-up signals are obtained since the exposure intensity is too high, and wherein the total number of pixels in the portion recognized as black is defined as the total number of pixels which are necessarily judged to be black since only weak image pick-up signals are obtained because of weak intensity.

From the numbers of pixels in the portion recognized as white and in the portion recognized as black, the luminance information of the entire image pick-up screen and rough information about luminance distribution are obtained, and the exposure control means determines the second preliminary exposure condition according to the information obtained above. In the manner explained above, almost all of the necessary information about pixel distribution can be obtained, except for the cases in which photographing is conducted under special conditions. Consequently, metering can be completed when preliminary exposure has been conducted twice.

In another example of the present invention, when rough information about the luminance of the image pick-up screen is obtained and the first preliminary exposure condition is determined according to the information (in other words, when the screen seems bright, the exposure condition is shifted to the high luminance side, and when the screen seems dark, the exposure condition is shifted to the low luminance side), there is a high possibility that metering can be completed by conducting exposure only once, and that at the worst, metering can be completed by conducting preliminary exposure twice.

In another further example of the present invention, the amount of exposure is varied so that exposure is conducted for the purpose of metering until the total amounts of pixels in the portion recognized as white and the portion recognized as black become not more than a predetermined value. By the method described above, even when the photographic object exists over a wide range of luminance, the accuracy of a histogram to be made can be guaranteed, and further whatever the objects are, the effects of the present invention can be obtained.

Further, the exposure control mechanism of the present invention comprises: an image sensor; an exposure regulating means which regulates the exposure of the above-described image sensor; a drive means which drives the above-described exposure regulating means; an exposure control means which controls the above-described drive means; and a luminance information obtaining means which obtains the luminance information of an image pick-up screen according to a luminance signal obtained from the above-described image sensor.

The above-described luminance information obtaining means is characterized in that: the number of pixels of the above-described image pick-up screen is counted at each elemental luminance region obtained by dividing the luminance level into narrow regions, and the distribution of the number of pixels is grasped at each elemental luminance; the number of pixels belonging to the evaluation luminance region which is composed of elemental luminance regions adjacent to each other, is counted in order to find the evaluation value of each evaluation region; and when the above-described evaluation value is found, in an evaluation region, weighting is changed according to the position of the elemental luminance region in the evaluation region so that the evaluation value is computed by adding the value which is obtained by multiplying the number of each elemental luminance region by the weighting value. The above-described exposure control means controls the above-described drive means in order to realize the exposure conditions so that the signal level of the evaluation luminance region in which the computed evaluation value is large, can become proper.

The luminance information obtaining means is characterized in that: an element luminance region having a higher luminance level is given a larger weighted value than an element luminance region having a lower luminance level; and the number of pixels in each luminance region is multiplied by the weighted factor, and this value is added to each luminance value so that the evaluation value can be computed.

The exposure control means is characterized in that: when the number of pixels which exist on the high luminance side with regard to the evaluation luminance region evaluated to be the most, is more than a predetermined value, correction is conducted so that the exposure can be lowered.

Further, the exposure control means is characterized in that: when the number of pixels in the luminance region which is adjacent to the evaluation luminance region on the high luminance side, is larger than a predetermined value, exposure is executed in accordance with the main luminance region on the high luminance side and the output signal of the image sensor is processed so that a knee-point characteristic can be given in such a manner that the low luminance portion of the image pickup signal can be raised and the high luminance portion can be compressed.

In addition to the composition described above, the exposure control mechanism of the present invention is provided with an image sensor control means which controls the operation of image sensors, or is provided with a means which processes the output signal of image sensors. The exposure control means executes exposure in accordance with the main luminance region on the high luminance side when the number of pixels in the luminance region adjacent to the evaluation luminance region on the high luminance side is larger than a predetermined value. The above-described image sensor control means drives the above-described image sensors so that the knee-point characteristic can be applied in such a manner that: the low luminance portion of the image pick-up signal which is obtained by the exposure can be raised and the high luminance portion can be compressed, or the image sensor control means processes the output signal of the image sensors.

The above-described knee-point control has been conventionally conducted in such a manner that: the knee-point control is applied or not applied; or the knee-point characteristic is fixed. On the other hand, in the case of the present invention, the knee-point control is conducted in such a manner that: the knee-point control is applied or not applied; or the knee-point characteristic is controlled in accordance with the information of luminance distribution of an image.

It should be understood that the knee-point characteristic is not applied to luminance signals in this specification hereinafter.

An evaluation luminance region, which is used as the base when an evaluation value is computed from a luminance histogram, has a predetermined width, so that there exists a distribution of pixels even in the evaluation luminance region. In other words, even when the evaluation of a luminance region is the maximum, there are the following cases: the pixels exist uniformly in the region; the pixels are concentrated on the low luminance side; and on the contrary, the pixels are concentrated on the high luminance side.

In order to take measures against the situation described above, the concept of weighting has been introduced in order to improve the reliability of the evaluation values by changing the weighting values according to the position of the pixels in the evaluation luminance region.

The above-described weighting is conducted in principle in such a manner that: the weighting value is high on the high luminance side and low on the low luminance side. For example, when an evaluation region has a width of 2 Lv, the pitch of which is 0.5 Lv, the weighting values are given as follows: when the weighting values are aligned in order from the high luminance side to the low luminance side, they can be represented by 1, 1, ½ and ¼. The reason is as follows: when a luminance region of which evaluation is the maximum is selected, the exposure is adjusted to the maximum luminance of the luminance region in order to prevent the occurrence of the portion recognized as white. Consequently, the signal level of the high luminance region close to the maximum luminance becomes the most proper, so that the evaluation of the high luminance side is increased and that of the low luminance side is decreased.

However, when the knee-point characteristic is given to the luminance signal and the characteristic is fixed, the weighting of the high luminance portion is reduced in accordance to the knee-point characteristic.

In some cases, it is better to control the exposure giving consideration not only to the luminance level of the photographic object but also to the luminance level of the background or the things peripheral to the photographic object. In this case, a desirable image in which the averaged luminance is decreased can be obtained in such a manner that: the luminance region of the maximum evaluation is found; the area of the portion recognized as white is computed on the assumption that photographing is conducted under the exposure condition determined in accordance with the above-described luminance region; and when the area is larger than a predetermined value, the correction is conducted so that the exposure is reduced, in other words, the exposure is corrected so that it can be adjusted to a higher luminance level than that of the maximum evaluation.

When the area of the portion recognized as white is large after the luminance region of the maximum evaluation has been found, and further when a large number of pixels are concentrated in a high luminance region close to the luminance region of the maximum evaluation, exposure is conducted while the exposure is being adjusted to the above-described high luminance region under the conditions of reduced exposure so that the gradation of the whole image can be well balanced. However, when photographing is conducted under the exposure conditions described above, the gradation of the photographic object is deteriorated, in other words, the luminance level is lower than that of the actual exposure conditions, so that the quality of obtained images is not so high. In order to take measures against the problem described above, while the gradation of the whole image is well balanced, the luminance of the photographic object is represented by a proper level in such a manner that: the knee-point characteristic is given by knee-point-driving of image sensors or by knee-point processing of the output signal of image sensors so that the gain of the low luminance portion can be raised and that of the high luminance portion can be compressed.

The exposure correction mechanism of the present invention is characterized in that: a plurality of luminance regions are established by sorting the luminance values; a luminance histogram is made by counting the number of pixels of each luminance region on an image screen; and exposure control is conducted according to the luminance histogram. The exposure correction mechanism of the present invention comprises: an image sensor; an exposure regulating means which regulates the exposure of the image sensor; an exposure control means which controls the operation of the above-described exposure regulating means; a luminance histogram making means which counts the number of the pixels of each luminance region on an image screen according to the luminance signal obtained from the above-described image sensor, and which makes a luminance histogram according to the results; an evaluation value obtaining means which processes the information of the histogram and finds an evaluation value at each luminance region of a predetermined width; and an exposure correction signal input means which inputs a signal to indicate the correction of exposure; a luminance region detection means corresponding to a secondary photographic object is provided, which is operated in such a manner that when the above-described exposure correction signal is inputted, the most important luminance region in which the evaluated value becomes the maximum, is ignored, and the luminance region of the secondarily important photographic object is detected by the means. In a normal operation, the above-described exposure control means conducts exposure control in accordance with the luminance region in which the above-described evaluation value becomes the maximum. In the case where the above-described exposure correction signal is inputted and the exposure mechanism becomes the exposure correction mode, exposure control is conducted in accordance with the secondarily important luminance region which was detected by the luminance detection means corresponding to the above-described secondary photographic object.

In the above-described explanation, the most important luminance region is defined as the luminance region corresponding to the photographic object which occupies the largest area in the image screen. The secondarily important luminance region is defined as the luminance region corresponding to the photographic object of which area is the second largest in the image screen. The above-described definition is the same in the case of the third most important luminance region. When there is a photographic object which occupies a large area in the image screen, the evaluated value of the luminance region to which the above-described photographic object contributes with regard to the evaluation, becomes the highest. The large area of the photographic object has a great influence on the evaluated values peripheral to the object. When the area of the second largest photographic object is relatively small, the evaluation value of the luminance region peripheral to the luminance region of which the evaluation value is the highest corresponding to the photographic object of which area is the largest, becomes larger than the evaluation value of the luminance region corresponding to the second largest photographic object. Consequently, the evaluation value of the second largest area does not necessarily means that the luminance region is secondarily important. When the evaluation value is the highest, it means the luminance region is the most important.

According to the patent (Japanese Patent Application No. 70409/1989) by the inventors, the following exposure control system was disclosed: the pixels on an image screen are sorted according to the luminance values; the number of pixels which belong to a predetermined luminance region are counted; the evaluation values are found at each predetermined width of a luminance region; and exposure control is conducted in such a manner that an image pick-up signal of the luminance region of which evaluation value is the highest, can become the most proper level. The system described above is advantageous in that: when the size of a photographic object is relatively large, photography is hardly affected by background light; and the luminance of an image pick-up screen can be accurately grasped in the form of a histogram, so that accurate information can be obtained, compared with a conventional exposure control system.

This accurate luminance information is fully utilized in order to automatically set the correction to the most proper value when exposure correction is conducted.

A typical example of the case in which a normal exposure condition can not be applied and in which exposure correction is performed, is as follows: exposure is set in accordance with a subject which is not the main photographic object, wherein the size of the subject is so small that it is difficult to set the exposure in accordance with the subject.

In order to deal with the situation described above, the conditions of a proper exposure correction can be automatically set as follows in the case where exposure is performed in accordance with a subject other than the main photographic object: the pixels on an image screen are sorted according to the luminance so that a luminance histogram can be obtained; the maximum luminance portion is neglected, wherein the maximum luminance portion is the portion in which the evaluation value obtained by a predetermined signal processing becomes the maximum; the secondarily most important (or the third most important) luminance region (a sub-peak) is detected by a sub-peak detection means; and exposure control is executed in accordance with this sub-peak.

Two examples of the method to detect the sub-peak are as follows. In one, the changing curve of the luminance histogram is differentiated so that the inflection point can be found in order to check the existence of a peak; and the absolute value of the peak is judged in order to recognize the existence of the second and after second peaks. In the other example the luminance histogram value of the luminance region (the main peak) of which the evaluation value is the maximum, is set to zero; and the luminance region, the evaluation value of which is the highest among the other luminance regions, is recognized as the second peak (a sub-peak).

BRIEF DESCRIPTION OF THE DRAWINGS

FIG. 28(a), FIG. 28(b) and FIG. 28(c) are histograms which explain the procedure of the second peak detection in the thirteenth example, wherein FIG. 28(a) is a luminance histogram which was made according to the luminance information, FIG. 28(b) an evaluation histogram which was made according to the computed evaluation value, and FIG. 28(c) is an evaluation histogram which was made again under the condition that the luminance of the first peak is zero.

DESCRIPTION OF THE PREFERRED EMBODIMENTS

Figure 1:
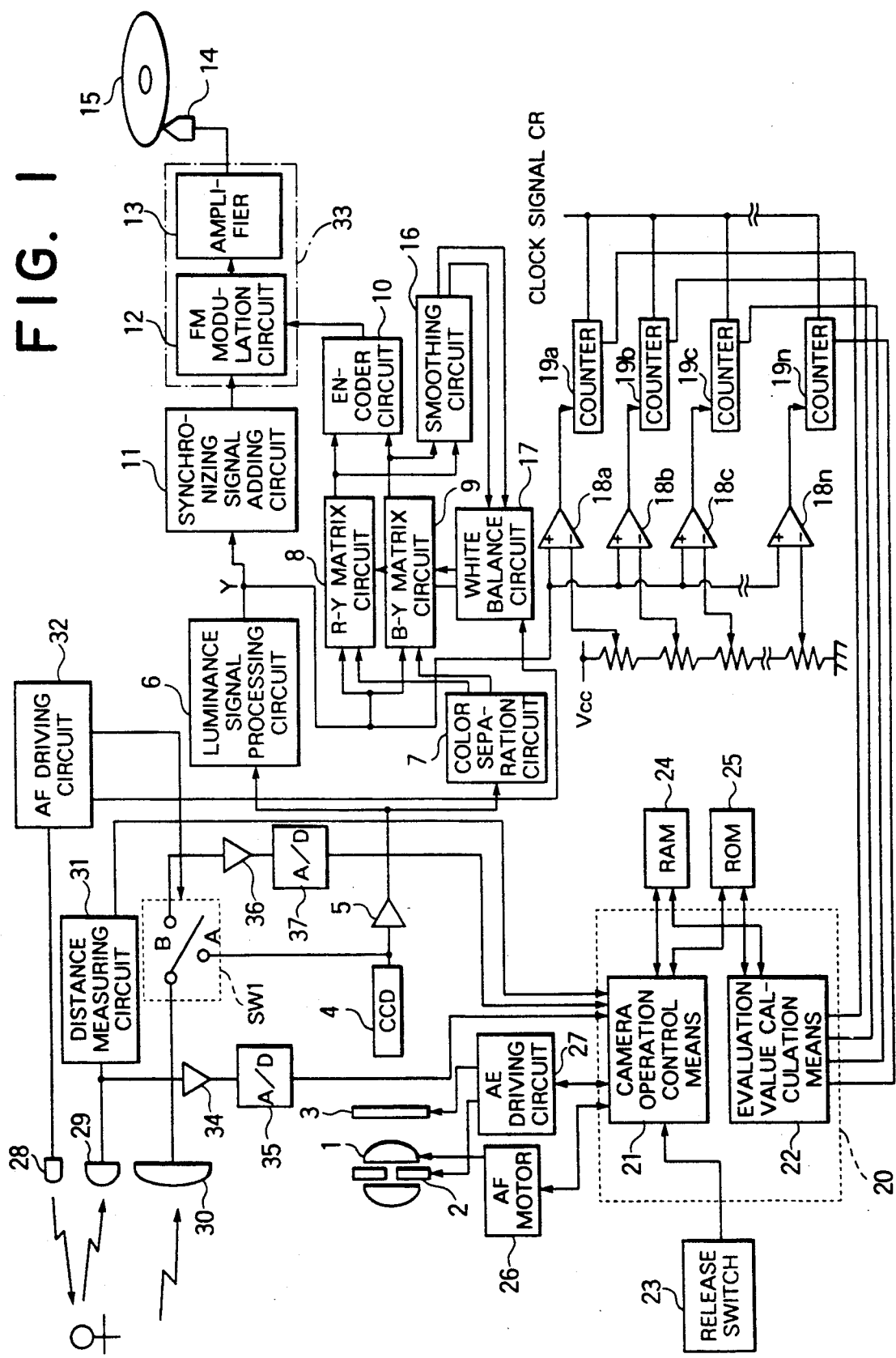
FIG. 1 is a schematic illustration which shows an example of the control mechanism of the camera of the present invention.

Referring now to the drawings, the examples of the present invention will be explained as follows.

EXAMPLE 1

FIG. 1 is a block diagram of an example of the exposure control mechanism of a camera of the present invention. This block diagram will be used to explain the second to the fifth examples later.

The whole composition of the exposure control mechanism of the present invention will be explained as follows.

In order to adjust the amount of exposure, the iris mechanism 2 and the shutter 3 are provided in the position close to the lens system 1. The iris mechanism 2 and the shutter 3 are driven by the AE drive circuit 27. The lens system 1 is driven by the AF motor 26.

The operation of the AE drive circuit 27 and AF motor 26 is controlled by the CPU 20, and the operation of the whole camera is also controlled by the CPU 20.

The CPU 20 is provided with the camera operation control means 21 and the evaluation value computing means 22 which are used as a function block, wherein a function block is a means to realize a predetermined function when hardware is driven by software. When the release switch 23 is operated, these function blocks conduct a predetermined control. Specifically, when the release switch 23 is pressed a little, automatic exposure control and distance measuring are conducted. When the release switch 23 is completely pressed after that, photographing and recording operations are conducted.

The CCD(the image sensor) 4 converts the optical signal on an image screen into an electric signal. The output signal of the CCD 4 is amplified by the amplifier 5 and inputted into the luminance signal processing circuit 6 and the color separation circuit 7.

The luminance signal processing circuit 6 generates luminance signal (Y), and the color separation circuit 7 separates color signals. The color difference signal outputted from the matrix circuits 8, 9 is encoded by the encoder circuit 10 and inputted into the recording circuit 33. A synchronizing signal is added by the synchronizing signal adding circuit 11 to luminance signal (Y) outputted from the luminance signal processing circuit 6, and luminance signal (Y) is inputted into the recording circuit 33. The recording circuit 33 is provided with the FM modulation circuit 12 and the amplifier 13, and the output of the amplifier 13 is recorded on the floppy disk 15 by the recording head 14.

When exposure is controlled automatically, luminance signal (Y) outputted from the luminance signal processing circuit 6 is inputted into a counting means composed of a plurality of comparators 18a to 18n and counters 19a to 19n, which count the number of pixels in each luminance region. The voltage obtained by dividing power source voltage Vcc with resistance is inputted into the reverse terminals of the comparators 18a to 18n, wherein the difference between the values of divided voltage corresponds to the difference 0.5 Lv between the values of luminance. Clock signal CR is commonly inputted into the counter circuits 19a to 19n. Each counter circuit counts clock signal CR while the outputs of the comparators 18a to 18n are on a high level, in other words, while the outputs of the comparators 18a to 18n exceed the lower limit of each luminance region. In the case of a still video camera, the scanning time of an image screen is 1/60 sec, so that when the image screen is divided into about 60,000, the frequency of clock signal CR is estimated at 3.8 MHz.

The counted values of the counters 19a to 19n are inputted into the evaluation value calculating means 22 provided in the above-described CPU 20. The evaluation value calculating means 22 makes luminance histograms of the image screen according to the counted values. The evaluation value calculating means 22 adds the number of pixels not exceeding 2 Lv within the obtained luminance range, calculates the evaluation values at each evaluation luminance region, and notifies the calculation result to the camera operation control means 21.

The camera operation control means 21 determines the luminance region in which the evaluation value becomes the highest, and controls the exposure so that the image pick-up signal of this luminance region can be on the most proper level.

The numeral 28 is an LED for use in AF which is used for measuring a distance, and the numeral 29 is an optical sensor. The LED 28 emits light when it is driven by the AF drive circuit 32. The output of the optical sensor 29 is inputted into the distance measuring circuit 31 so that the distance from the camera to a photographic object can be measured.

The numeral 30 is an AWB sensor for use in automatic white balance. In the normal AWB operation, switch SW1 is changed over to the terminal A side, and when the information about the luminance of a photographic object is obtained (which will be explained in an example described later), switch SW1 is changed over to the terminal B side. The changeover of switch SW1 is controlled by the AF drive circuit 32.

SPECIFIC EXAMPLE OF EXPOSURE CONTROL ACCORDING TO THE PRESENT INVENTION

In this example, the output signal and the amount of incident light of the CCD (the image sensor) 4 are in a perfect proportional relation. An example of the relation between the luminance of an image pick-up screen and the level of an image pick-up signal is illustrated in FIG. 2, wherein the value of luminance is exponentially compressed in FIG. 2.

When the operational range of AE is 8 to 16 Lv and complete information of pixel distribution is needed with regard to the luminance of the image screen, exposure must be conducted three times in such a way as a, b and c. However, in most cases, when a luminance histogram of a certain level is obtained, a proper exposure control can be conducted. Accordingly, in this example, the first exposure is conducted under the condition that the middle luminance range within the AE operational range can be covered, and the exposure condition of the second exposure is determined according to the image pick-up signal obtained in the first exposure.

Figure 2:
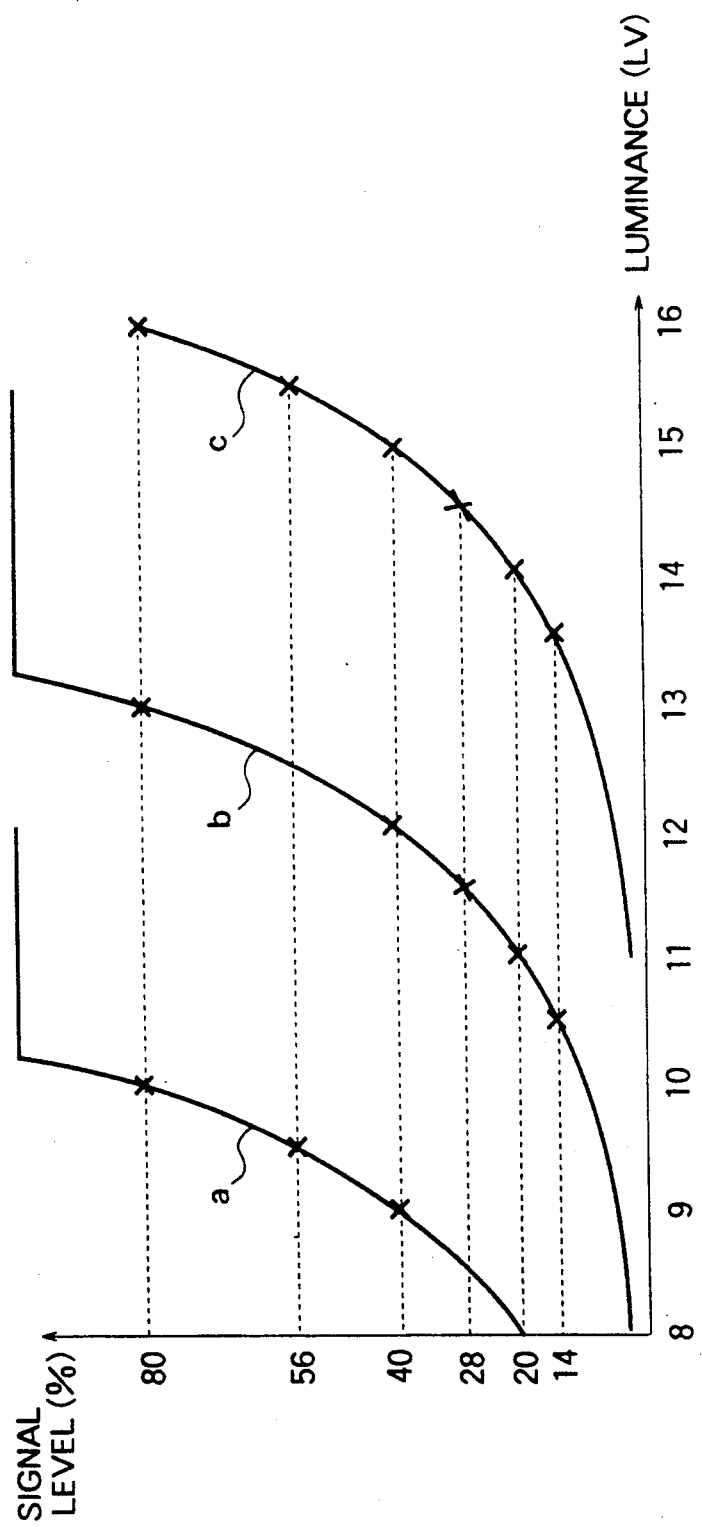
FIG. 2 is a characteristic diagram which shows the characteristics of a CCD (an image sensor), wherein the relation between the luminance and the signal level is shown.

Namely, when the release switch 23 is pressed a little, the camera operation control means 21 controls the iris mechanism 2 and the shutter 3 in such a manner that the condition of b in FIG. 2 can be satisfied, then executes the first exposure.

Luminance signal (Y) obtained in the manner described above is inputted into the pixel number count circuit 22 which is composed of the comparators 18a to 18n and the counters 19a to 19n, and the output of each counter is inputted into the evaluation value calculating means 22.

Figure 3:
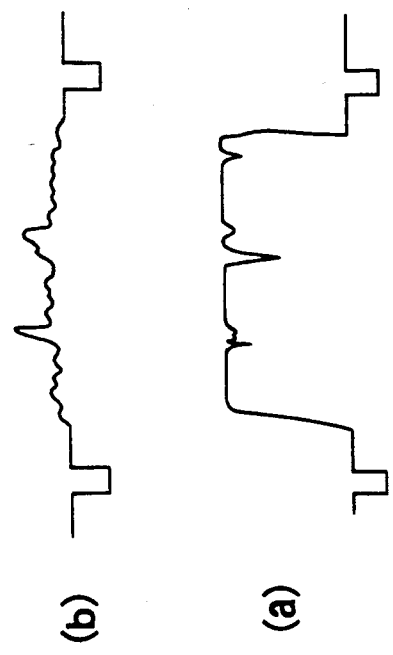
FIGS. 3(a) and 3(b) are a graph which shows the state of an image pick-up signal obtained by metering.
Figure 4:
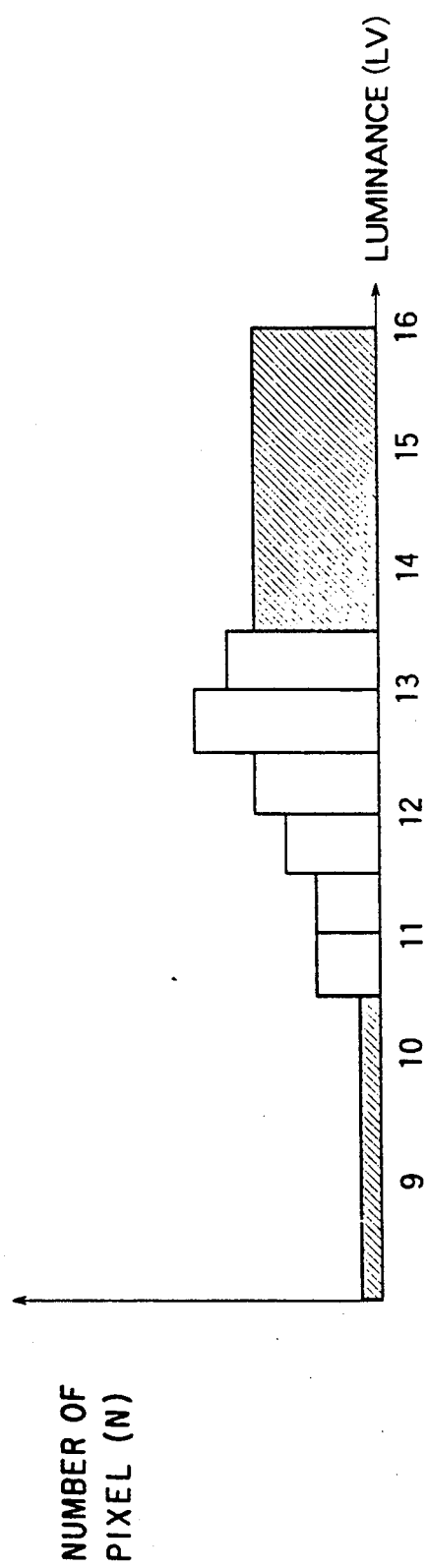
FIG. 4 is a histogram which was made according to the image pick-up signal obtained in the first exposure in the first example.

In the case in which there are many portions recognized as white in the obtained signal as illustrated in FIG. 3(a), an example of the luminance histogram made by the evaluation value calculating means 22 is shown in FIG. 4. Namely, in the region of middle luminance (10.5 Lv to 13.5 Lv), a histogram, the pitch of which is 0.5 Lv and the pixel number of which is accurate, can be obtained. As for high and low luminance portions, details are not shown in the histogram. However, the total number of pixels which exist in the high and low luminance portions, can be grasped, and it is obvious that there are many pixels in the high luminance portion, the portion recognized as white. On the other hand, there are few pixels in the low luminance portion, the portion recognized as black.

In the case explained above, the camera operation control means 21 selects the condition c shown in FIG. 2 as the second exposure condition, and the amount of exposure is reduced so that accurate pixel information of the high luminance portion can be obtained. When the pixel information obtained in the manner described above is used in order to make a luminance histogram, the pixel distribution in the range of 10.5 Lv to 16 Lv can be almost completely grasped, so that it is possible to control the exposure accurately even though the pixel information of the low luminance portion can not be obtained. As a result, metering is completed when exposure has been conducted twice.

When the evaluation value becomes the highest in the luminance range of 12 to 14 Lv according to the result of the evaluation value calculation in the range of 2 Lv conducted by the evaluation value calculating means 22, the camera operation control means 21 controls the iris mechanism 2 and the shutter 3 so that the signal level of the luminance range can become the most proper. In this way, exposure control is completed. When the release switch 23 is completely pressed after that, photographing is conducted and the image signals are recorded in the floppy disk 15.

On the other hand, in the case in which there are many portions recognized as black in the image pick-up signal obtained in the first exposure, the second photographing is conducted under the condition of a in FIG. 2 in order to obtain accurate pixel information about the low luminance portion. After that, a proper evaluation is conducted and photographing is conducted.

FLOW OF CONTROL OPERATION

Figure 5:
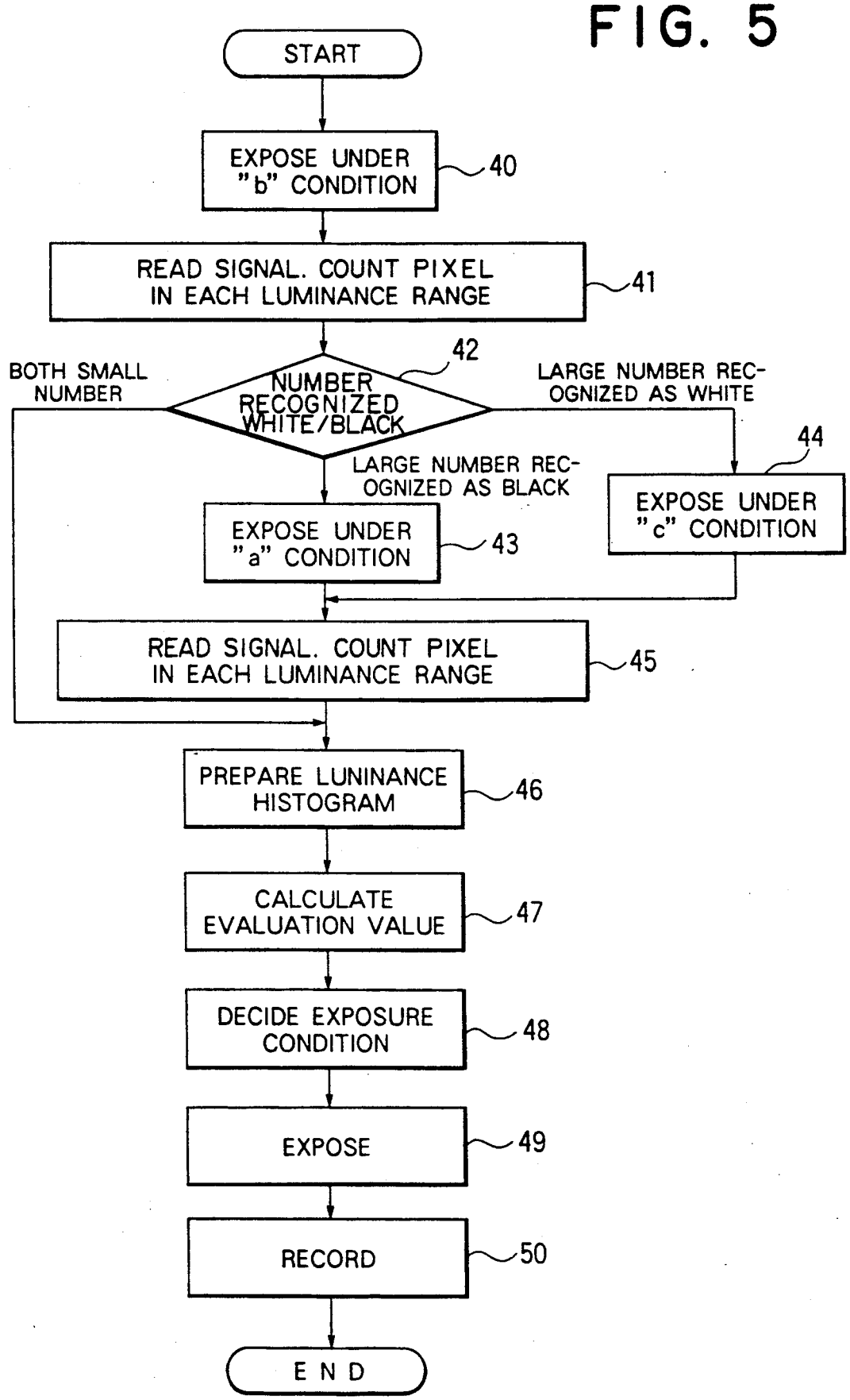
FIG. 5 is a flow chart which shows the control procedure in the first example.

FIG. 5 is a flow chart which explains the control procedure in the example.

When a photographer presses the release switch 23 a little, exposure control is started and the first exposure is conducted under the condition of b in FIG. 2 (step 40).

Then, the image pick-up signal is read out; the number of pixels are counted in each luminance region (step 41); and the amount of portions recognized as white or black is judged (step 42). When the amount of portions recognized as black is large, the second exposure is conducted under the condition a in FIG. 2 (step 43). When the amount of portions recognized as white is large, the second exposure is conducted under the condition of c in FIG. 2 (step 44). Next, the image pick-up signal obtained in the second exposure is read out; the number of pixels in each luminance region is counted (step 45); and the luminance histogram is made according to the obtained information (step 46).

On the other hand, when the amount of the portions recognized as white and that of black are small in step 42 and the information of pixel distribution of main portions has already been obtained in the first photographing, the luminance histogram is made without conducting the second exposure (step 46).

After that, the evaluation value is calculated (step 47); the exposure conditions are determined according to the evaluation value (step 48); exposure is conducted (step 49); and the obtained image pick-up signal is recorded in a floppy disk (step 50).

EXAMPLE 2

In the example explained above, the condition of the first exposure is uniformly set to the value in the middle of AE operation range. However, if the information about the luminance of the photographic object can be roughly obtained, the condition of the first exposure can be determined according to the information.

Namely, when the luminance of the photographic object is high, the first exposure is conducted under the condition which is shifted to the high luminance, compared with the condition b in FIG. 2. When the luminance is low, the first exposure is conducted under the condition which is shifted to the low luminance side, compared with condition b in FIG. 2.

The amount of exposure shift is judged according to the averaged value of the input signal which shows the luminance of the photographic object. In the way described above, there is a high possibility that metering is completed by conducting exposure once. At the worst, metering can be positively completed by conducting exposure twice.

In order to obtain the information about the luminance, it is preferable that the detection signal of a sensor which is used for other purposes is utilized without adding a new sensor. In the manner described above, the composition of the apparatus can be prevented from becoming complicated.

In this example, an active AF (automatic focusing) sensor 29 is utilized for the sensor. As illustrated in the upper left portion of FIG. 1, the active AF measures a distance by detecting the reflected light emitted by the infrared LED 28. In this case, the active AF detects only the signal which has just been emitted by the LED 28 in order to avoid the influence of the surrounding light. Accordingly, rough information about the surrounding luminance can be obtained by measuring the level of the signal outputted from the sensor 29 except when distance measuring is conducted in the manner described above.

In the case of the composition illustrated in FIG. 1, the signal detected by the sensor 29 is transmitted as follows: the signal cable is branched before the distance measuring circuit 31; the detected signal is amplified by the amplifier 34; the amplified signal is converted into a digital signal by the A/D converter 35; and the converted signal is directly inputted into the camera operation control means 21 in CPU 20. The camera operation control means 21 compares the inputted signal with a predetermined reference (which is previously stored in the ROM 25), and controls the iris mechanism 2 and the shutter 3 according to the results of the comparison so that the first exposure is conducted.

Figure 6:
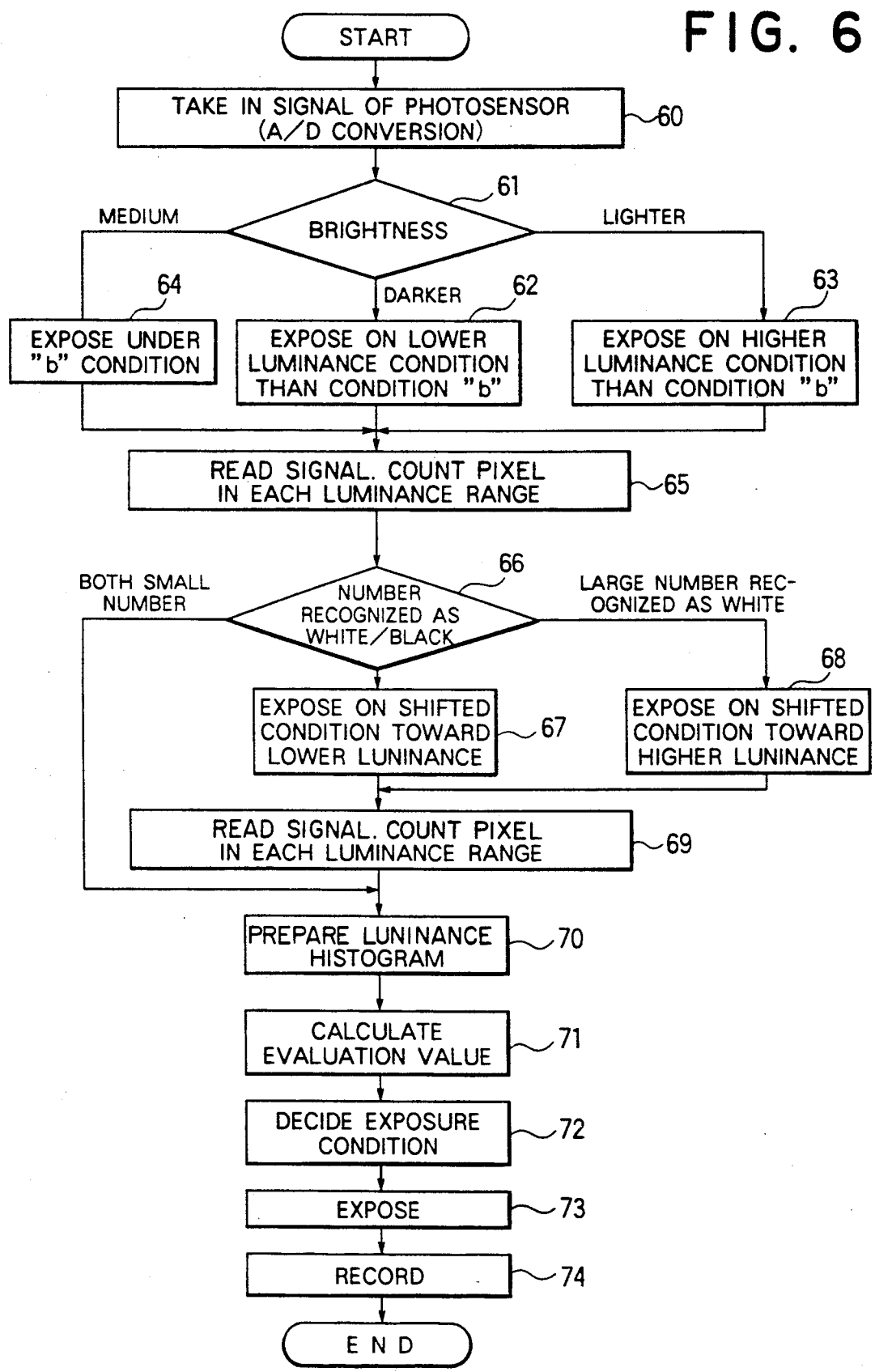
FIG. 6 is a flow chart which shows the control procedure in the second and third examples.

FIG. 6 is a flow chart which shows the procedure of this example.

First of all, the signal of the optical sensor 29 which has been A/D-converted by the A/D converter is taken in (step 60), and compared with a reference value so that the luminance can be judged (step 61). In this case, exposure is conducted in such a manner that: when it has been judged that the luminance is low, exposure is conducted on the low luminance side of condition b in FIG. 2 (step 62); when it has been judged that the luminance is high, exposure is conducted on the high luminance side of condition b (step 63); and when it has been judged that the luminance is medium, exposure is conducted according to condition b (step 64).

Next, the signal is read out and the number of pixels is counted in each luminance region (step 65), and the amounts of the portions recognized as white and black are judged (step 66). In the case where the amount of the portion recognized as black is large, the second exposure is conducted under the condition which is shifted to the low luminance side, compared with the first exposure (step 67). In the case where the amount of the portions recognized as white is large, the second exposure is conducted under the condition which is shifted to the high luminance side (step 68). Then the signal is read out and the number of pixels are counted in each luminance region (step 69), and the luminance histogram is made (step 70). When it is judged that the amount of the portions recognized as white and black is small and the luminance information of the main portions has already been obtained, the luminance histogram is made without conducting the second exposure (step 70).

Next, the evaluation value is calculated (step 71); the exposure condition is determined (step 72); exposure is conducted (step 73); and the image pick-up signal is recorded in a floppy disk (step 74).

EXAMPLE 3

In this example, information about the luminance of a photographic object is obtained from the AWB sensor 30 for use in automatic white balance adjustment.

In automatic white balance adjustment, the level difference of the color difference signal outputted from the matrix circuits 8, 9 can become zero by the action of the smoothing circuit 16 and the white balance circuit 17. When the above-described adjustment is conducted, switch SW1 illustrated in the upper left portion of FIG. 1 is changed over to the A terminal side by the control of the AF drive circuit 32. On the other hand, when the information about luminance is obtained in this example, switch SW1 is changed over to the terminal B side.

The signal obtained from the AWB sensor 30, which is an absolute value signal putting all colors together, is amplified by the amplifier 36, converted into digital data by the A/D converter 37, and inputted into the camera operation control means 21 in the CPU 20. The camera operation control means 21 conducts the control means according to the flow chart shown in FIG. 6 in order to control the exposure.

EXAMPLE 4

In this example, the information about the luminance of the photographic object is obtained by a passive AF sensor (not shown in the drawing).

The passive AF sensor measures the distance from the camera to a photographic object in such a manner that: the image of the object is formed on the sensor; and the distance is measured by the blur of the formed image and the discrepancy of the image position. In this example, the luminance of the photographic object can be guessed by the signal level of the sensor and the integral time of the sensor needed to obtain the signal.

EXAMPLE 5

As explained above, in most cases exposure is conducted once or twice for the purpose of metering. However, even though exposure has been conducted twice, metering is not necessarily completed. It is necessary to decide whether the exposure for metering should be continued or not by the number of pixels from which accurate information has not been obtained.

For example, when the luminance range of 19 Lv must be covered due to the specification of a camera, it is not adequate to start the exposure from the range of 10.5 Lv to 13.5 Lv, because when the luminance of the photographic object is very high, it is impossible to cover all the luminance region with two exposures. For example, when a portion recognized as white is left, further exposure is needed.

Figure 7:
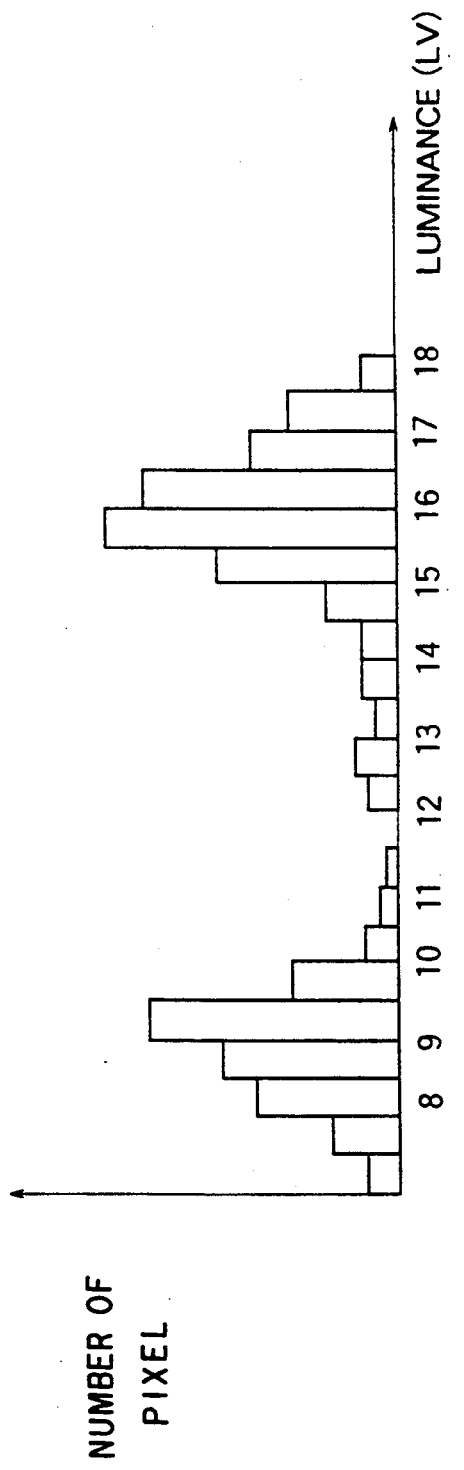
FIG. 7 is an example of a histogram of the luminance distribution of an image pick-up screen.

For example, in the case of a photographic object shown in FIG. 7, both the amounts of portions recognized as white and recognized as black are large after the exposure has been once conducted under the middle condition. In the case described above, it is not enough to select one of them, the larger, and conduct exposure changing the exposure condition. The reason is that the information of the luminance region which was not selected is neglected, so that a precise judgement can not be formed. In this case, it is preferable to also conduct exposure in accordance with the luminance region which was not selected initially.

Figure 8:
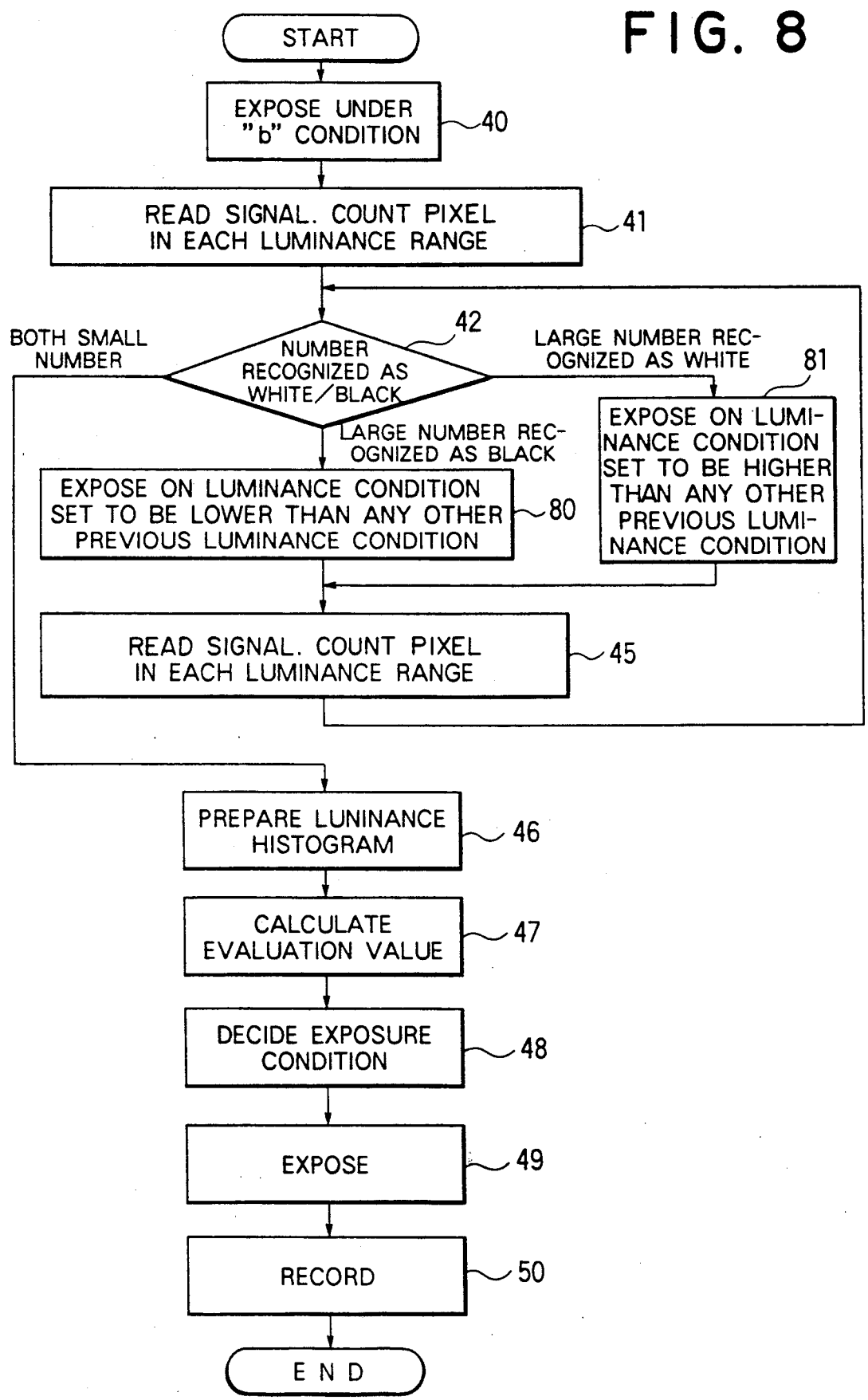
FIG. 8 and FIG. 9 are flow charts which show the procedure of the fifth example.
Figure 9:
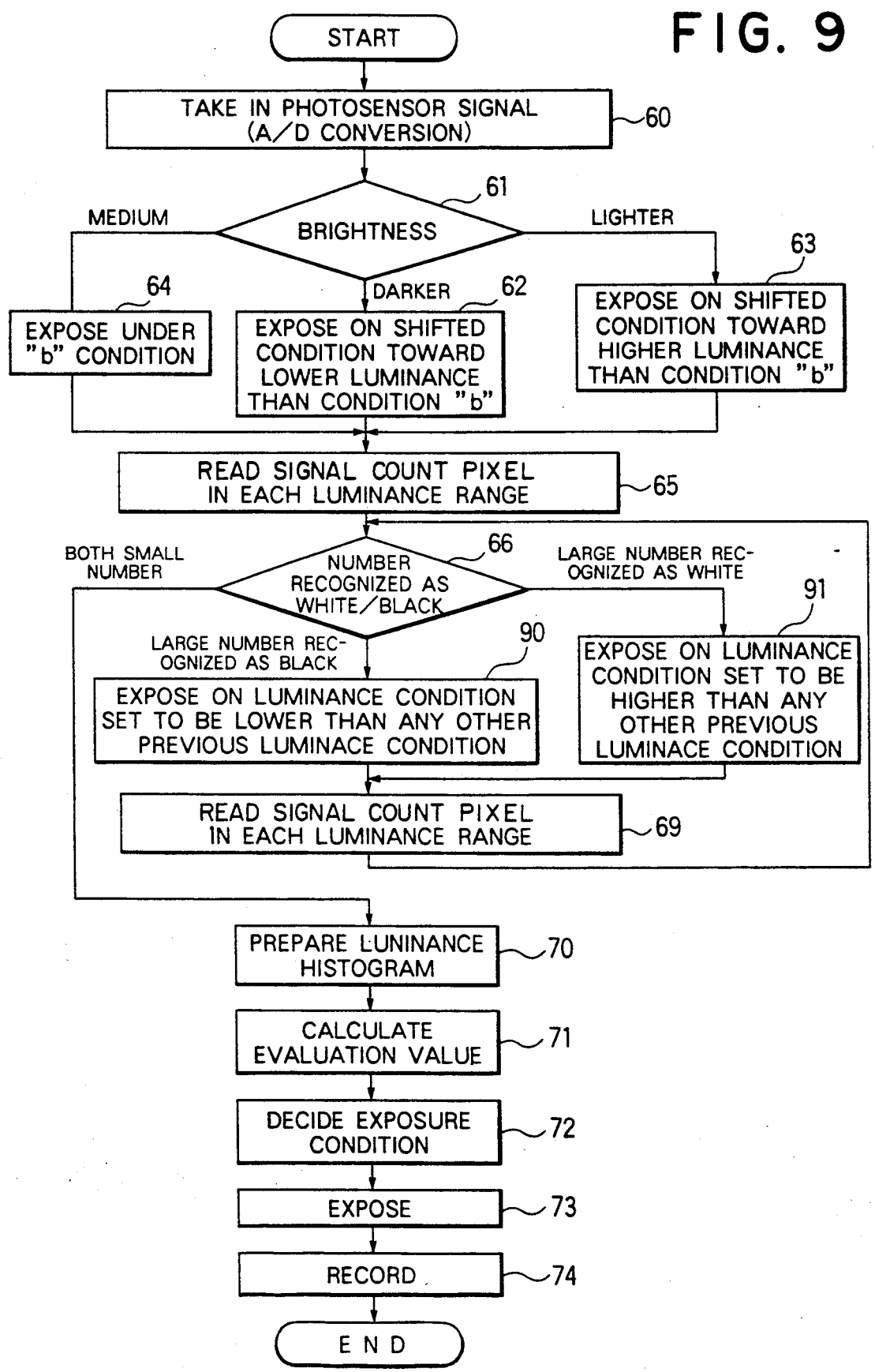

FIG. 8 and FIG. 9 are flow charts of the camera operation control means 21 in the case of the above-described control.

The flow chart shown in FIG. 8 is made in such a manner that: steps 43 and 44 in FIG. 5 are replaced by steps 80 and 81; the steps 45 and 46 are separated; a feedback loop from step 45 to step 42 is added. In the same way as explained above, the flow chart shown in 9 is made in such a manner that: steps 67 and 68 in FIG. 6 are replaced by steps 90 and 91; steps 69 and 70 are separated; and a feedback loop from step 69 to step 66 is added.

When the portions recognized as white are large in this example, the second exposure is conducted in accordance with the luminance of the high luminance side. As a result, luminance information about the high luminance side can be obtained. When the numbers of pixels of two portions are compared, one is the number of pixels which are recognized as black in the first and second exposure and the other is the number of pixels which are recognized as white in the first and second exposure, the number of pixels recognized as black is more than that recognized as white, so that exposure is conducted in accordance with the low luminance side. In this case, the conditions of exposure previously conducted twice are stored, and exposure is conducted being shifted to the low luminance side compared with the previously conducted exposure conditions. The exposure for metering is executed until the amount of portions recognized as black is decreased to the amount smaller than a predetermined value, in other words, until necessary information can be obtained. When the information necessary to make a luminance histogram has been obtained, exposure is completed even though the information to cover all luminance ranges has not been obtained.

EXAMPLE 6

Figure 10:
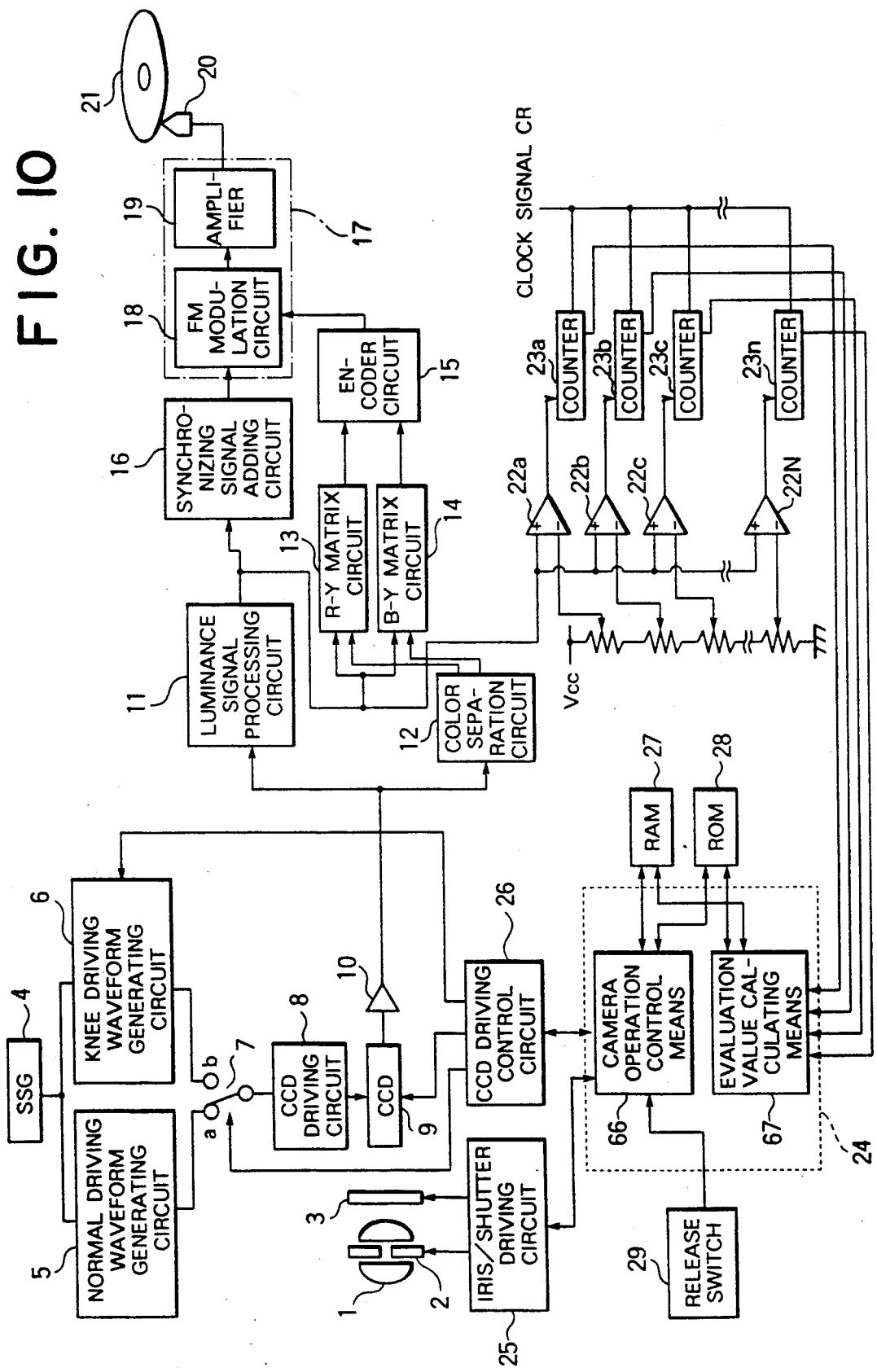
FIG. 10 is a schematic illustration which shows the sixth example of the control mechanism of a camera of the present invention.

FIG. 10 is a schematic illustration which shows the composition of another example of the exposure control mechanism of the present invention. The composition shown in FIG. 10 is commonly used in the examples 7 to 11 which will be explained later.

COMPOSITION

The iris mechanism 2 and shutter 3 of the exposure adjustment mechanism are provided to positions close to the lens system 1.

In this example, a shutter which shades the light incident upon a CCD is shown. However, an electronic shutter may be used in which photoelectric transfer is conducted by a CCD and the time to accumulate electrical charge is controlled. In the drawing, a mechanical type of iris is shown. However, an electronic (or liquid crystal) type of iris may be used.

The CCD (image sensor) 9 is driven by the CCD drive circuit 8 to which drive-wave forms are selectively supplied from the normal driving wave form generating circuit 5 or the knee-point driving wave form generating circuit 6 through the switch 7. These wave forms are made utilizing the output signal of the standard signal generating circuit (SSG) 4.

The iris mechanism 2 and shutter 3 are driven by the iris and shutter driving circuit 25, and the switch 7, the CCD 9 and the knee-point driving generating circuit 6 are controlled by the CCD driving control circuit 26.

The CPU 24 generally controls the operations of the iris shutter driving circuit 25, the CCD driving circuit 26 and the whole camera.

The CPU 24 is provided with function blocks of the camera operation control means 66 and the evaluation value calculation means 67, wherein the function block is a means which is built when the hardware is operated in accordance with the software in order to realize a predetermined function. When the release switch 29 is operated, these function blocks execute a predetermined control using the RAM 27 and ROM 28. In other words, when the release switch 29 is pressed a little, automatic exposure control and distance measuring are conducted. When the release switch 29 is pressed after that, the operation of photographing and recording is controlled.

The numeral 10 is an amplifier which amplifies the output signal of the CCD 9. The luminance signal processing circuit 11 generates luminance signal (Y) from an inputted amplifying signal, and the color separation circuit 12 separates color signals. The color difference signals outputted from the matrix circuits 13, 14 are encoded by the encoder circuit 15 and inputted into the recording circuit 17.

A synchronizing signal is added by the synchronizing adding signal 16 to luminance signal (Y) outputted from the luminance signal processing circuit 11. Then luminance signal (Y) is inputted into the recording circuit 17. The recording circuit 17 is provided with the FM modulating circuit 18 and the amplifier 19. The output of the amplifier 19 is recorded into the floppy disk 21 through the recording head 20.

When automatic exposure control (AE) is conducted, luminance signal (Y) outputted from the luminance signal processing circuit 11 is inputted into a counting means which counts the number of pixels of each elemental luminance region, wherein the counting means is composed of a plurality of comparators 22a to 22n and counters 23a to 23n. The voltage obtained by dividing power source voltage Vcc with resistance is inputted into the reverse terminals of the comparators 22a to 22n, wherein the difference between the values of divided voltage corresponds to the difference 0.5 Lv between the values of luminance. Clock signal CR is commonly inputted into the counter circuits 23a to 23n. Each counter circuit counts clock signal CR while the outputs of the comparators 22a to 22n are on a high level, in other words, while the outputs of the comparators 22a to 22n exceed the lower limit of each luminance region. In the case of a still video camera, the scanning time of an image screen is 1/60 sec, so that when the image screen is divided into about 60,000, the frequency of clock signal CR is estimated at 3.8 MHz.

The counted values of the counters 23a to 23n are inputted into the evaluation value calculating means 67 provided in the above-described CPU 24. The evaluation value calculating means 67 makes luminance histograms of the image screen according to the counted values. At the same time, the evaluation value calculating means 67 multiplies the counted values by a predetermined weighting factor (which is stored in the ROM 28). The evaluation value calculating means 67 adds the obtained values within the range of 2 Lv, calculates the evaluation values at each evaluation luminance region, and notifies the calculation result to the camera operation control means 66.

The camera operation control means 66 determines the luminance region in which the evaluation value becomes the highest, and controls the exposure so that the image pick-up signal of this luminance region can be on the most proper level.

EVALUATION ACCORDING TO THIS EXAMPLE

Figure 12:
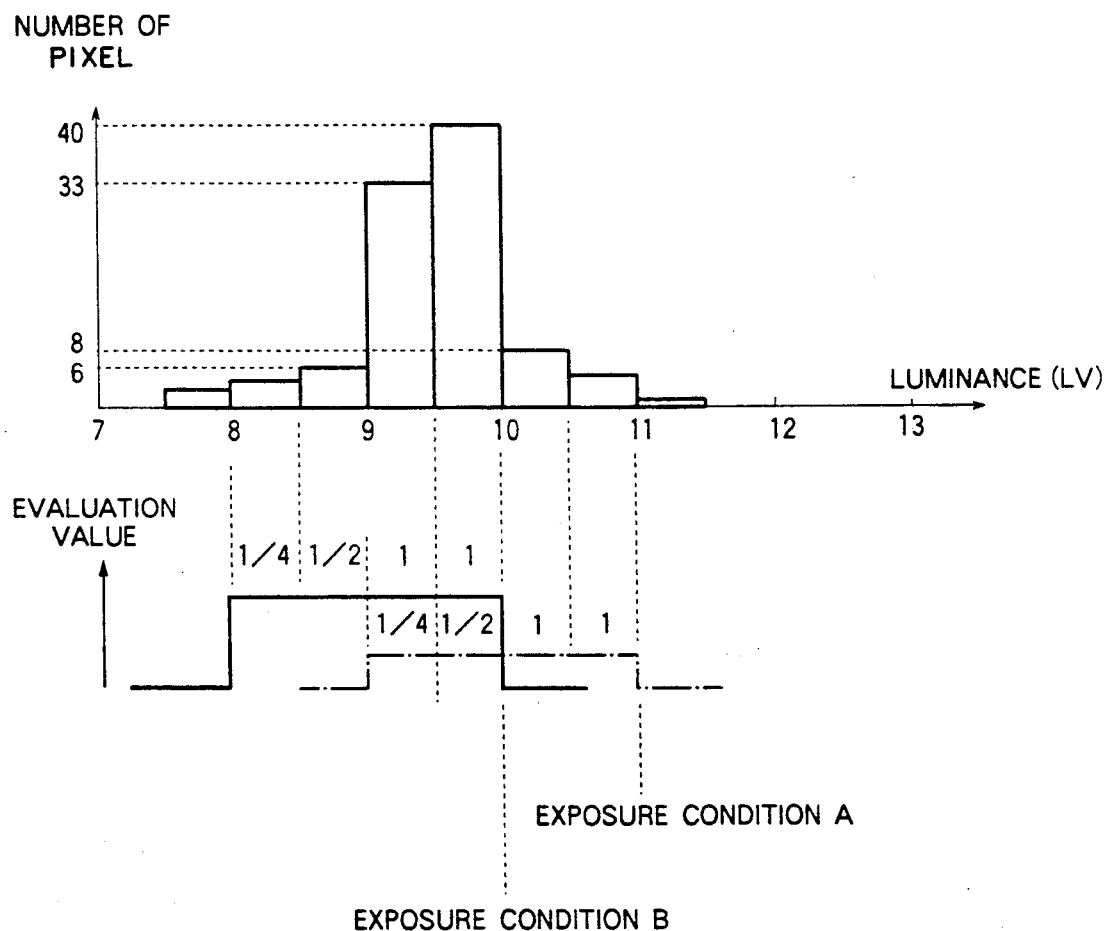
FIG. 12 is a graph which explains the method to determine the exposure conditions in the case in which weighting is conducted by the mechanism of the present invention.

Assume that the luminance histogram illustrated in FIG. 12 has been obtained as a result of preliminary exposure. The evaluation luminance region, the width of which is 2 Lv, is set up. The number of pixels of four elemental luminance regions belonging to an evaluation luminance region, the width of which is 0.5 Lv, are added in such a manner that: weighting factors of 1, 1, ½, ¼ are given to the elemental luminance regions, wherein the weighting factor 1 is assigned to the elemental luminance region of the highest luminance and the weighting factor ¼ is assigned to the elemental luminance region of the lowest luminance.

Figure 11:
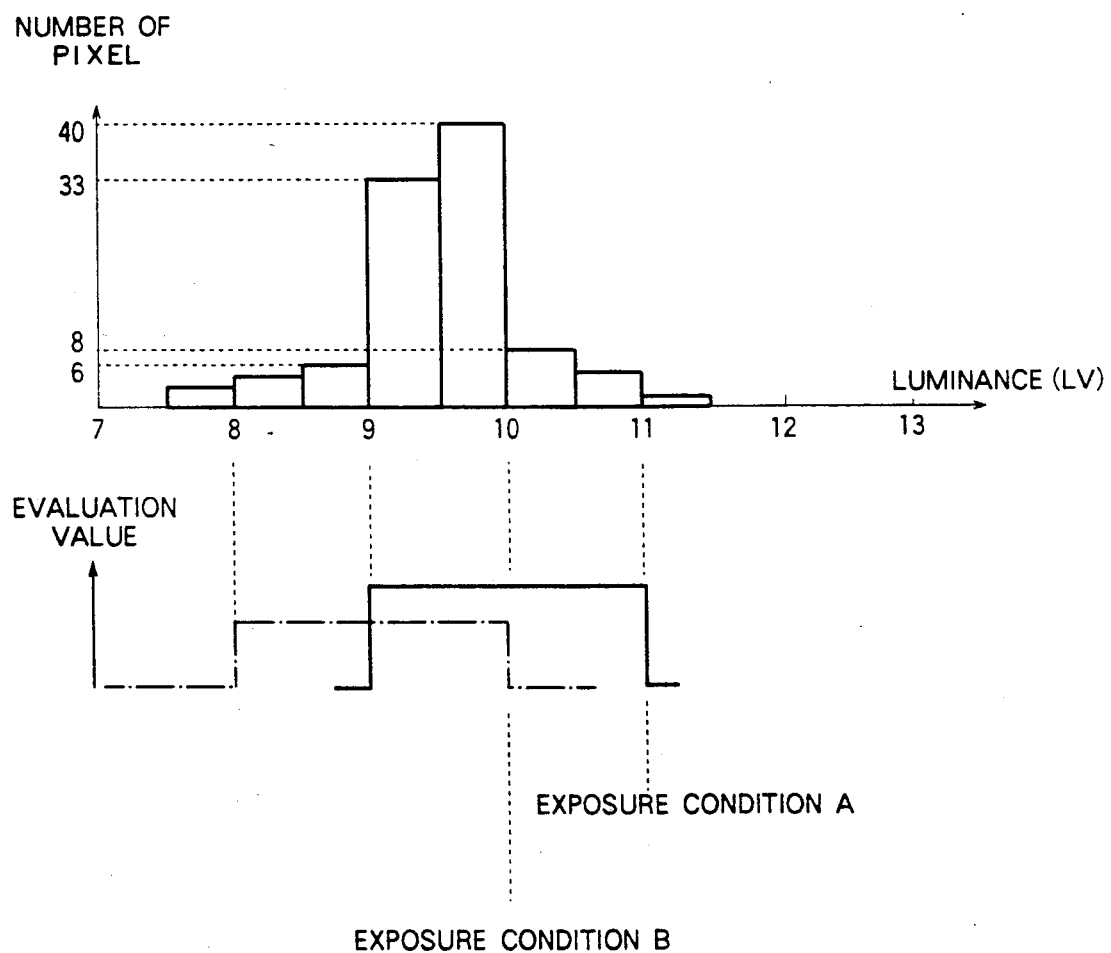
FIG. 11 is a graph which explains the problems caused when the evaluation is performed by a conventional method in which weighting is not conducted.

In the way described above, the luminance of the region of which evaluation is the maximum, is 8 to 10 Lv, so that exposure is conducted under exposure condition B. As a result, the main photographic object, the luminance of which is 9 to 10 Lv, is appropriately exposed, so that the conventional problem that the image of a photographic object is dark, which is illustrated in FIG. 11, can be avoided.

FLOW OF CONTROL

Figure 13:
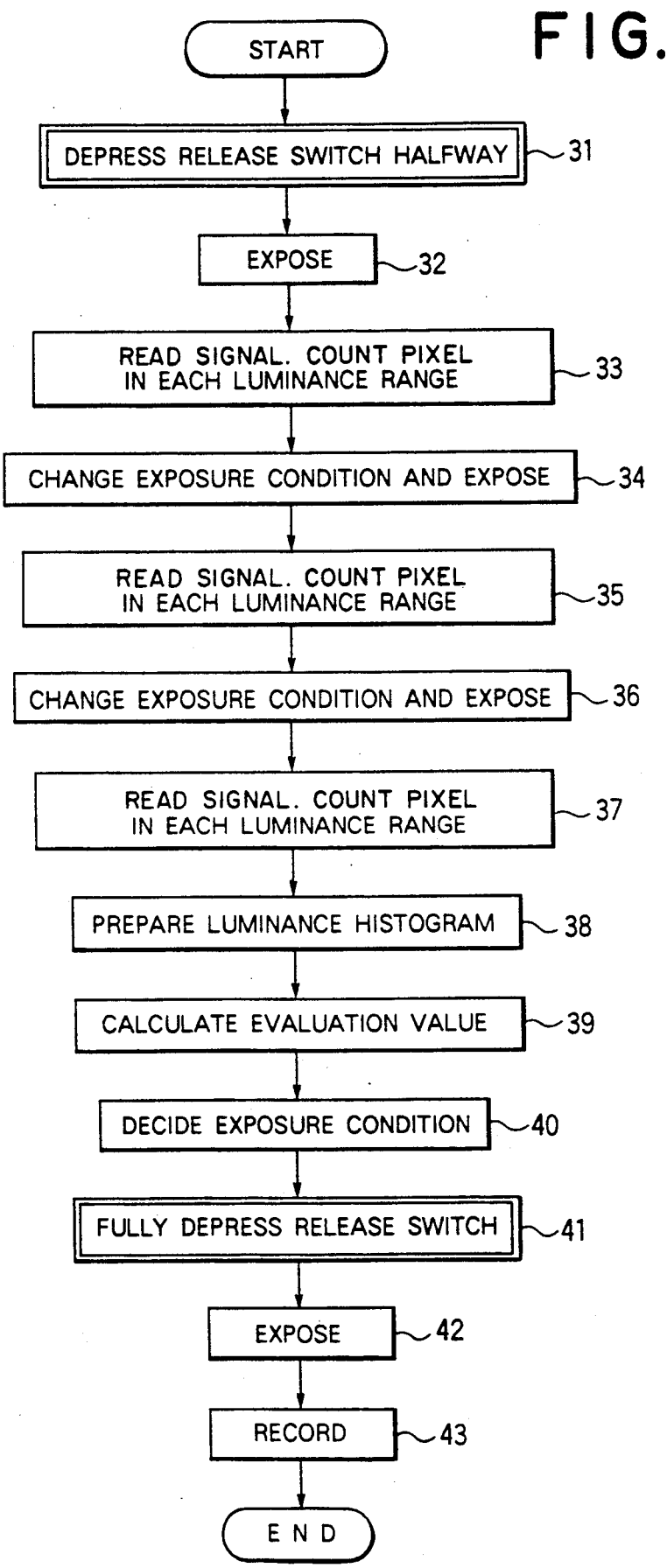
FIG. 13 is a flow chart which shows the procedure of the sixth example of the present invention.

FIG. 13 is a flow chart to explain the control procedure of this example. A block surrounded by a double line in the flow chart stands for the operation conducted by a photographer, which distinguishes the photographer's operation from the operation conducted by a camera.

First of all, a photographer presses the release switch 29 a little (step 31); the first exposure is conducted under the condition a of FIG. 2 (step 32); and the image pick-up signal is read out so that the number of pixels is counted in each luminance region (step 33).

Next, the second exposure is conducted under the condition b of FIG. 2 (step 34); and the signal is read out so that the number of pixels is counted in each luminance region (step 34).

Then, exposure is conducted under the condition of c of FIG. 2 (step 36); and the signal is read out so that the number of pixels is counted in each luminance region (step 37).

Next, a luminance histogram is made according to the counted values (step 38), and further addition is performed within the range of 2 Lv and the evaluation value is found in each evaluation luminance range (step 39). The exposure conditions are determined in such a manner that the image pick-up signal of the luminance range, the evaluation value of which is the largest, can be on an appropriate level (step 40).

Then, the photographer completely presses the release switch 29 (step 41); normal exposure is conducted (step 42); and the image pick-up signal is recorded on the floppy disk 21 (step 43).

In this example, weighting is conducted according to the position in the evaluation luminance region. It is further effective to conduct weighting according to the absolute value of the luminance in addition to the weighting according to the position in the evaluation luminance region. For example, it is rare that the luminance of a main photographic object is in the high luminance region, the luminance of which is not less than 16 Lv. Accordingly, when the weighting of this portion is previously made very small, proper exposure can be performed even though there is a bright sky in the background.

EXAMPLE 7

Figure 14:
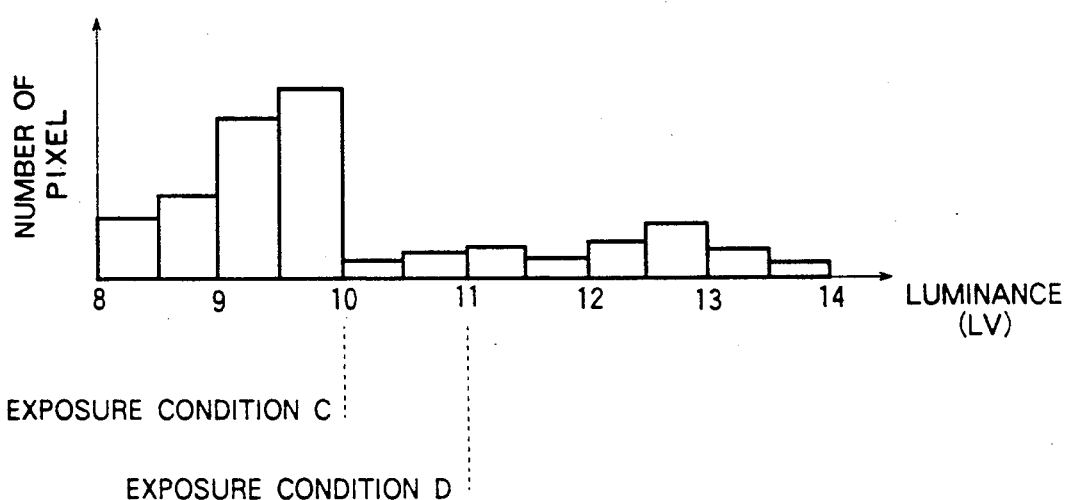
FIG. 14 is a histogram and FIG. 15 is a graph, which explain the setting method of exposure conditions in the seventh example of the present invention.

In the case in which the luminance histogram shown in FIG. 14 is obtained and weighting is performed in the range of 2 Lv, the evaluation value of the luminance range of 8 to 10 Lv becomes the largest and exposure is conducted under the condition of c.

Figure 15:
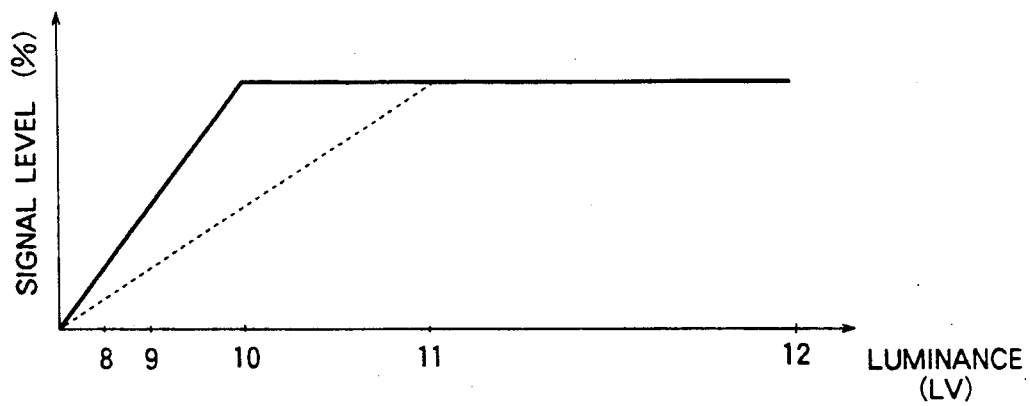

However, actually there are many pixels in the range of which luminance is not less than 10 Lv, so that when exposure is performed in accordance with the luminance of 10 Lv, the portion of which luminance is not less than 10 Lv becomes too white (the signal level not less than 10 Lv is saturated as illustrated in FIG. 15) and the averaged luminance of the image screen becomes too high, which is not desirable.

In order to solve the problem described above, the camera operation control means 25 conducts correction in such a manner that the exposure is shifted down by 1 Lv and exposure is performed under condition D (which is illustrated by a dotted line in FIG. 15). In the way described above, the averaged luminance of the whole image screen is reduced and a desirable image can be obtained.

Figure 16:
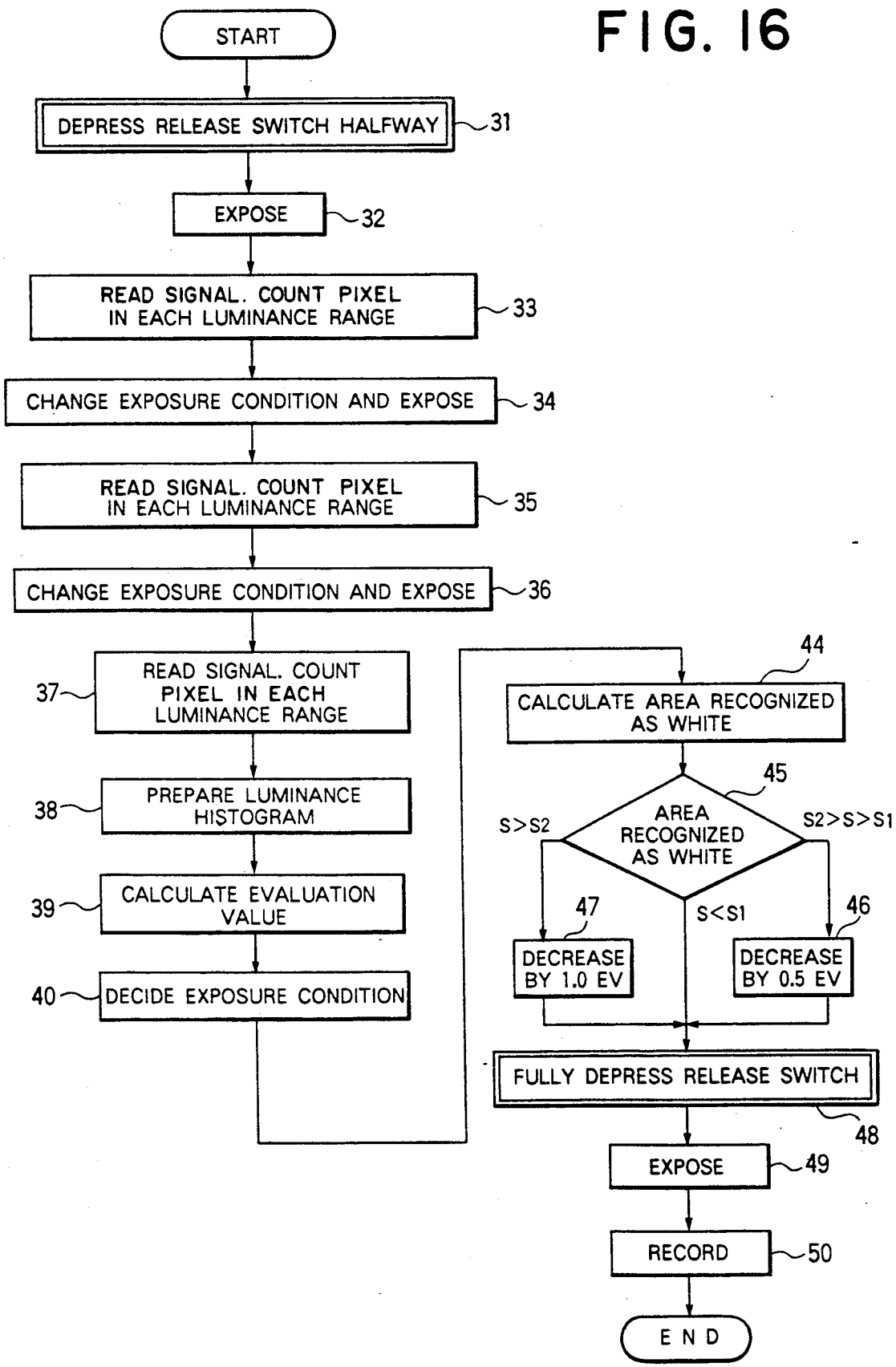
FIG. 16 is a flow chart which explains the procedure in the seventh example.

FIG. 16 is a flow chart which shows the operation conducted when the above-described control is executed.

The characteristic of this flow shown in FIG. 16 is: this flow chart is used as the calculation flow to calculate too white portions (steps 44 to 47) and is added to the flow of FIG. 13. The steps 31 to 40 of the flow chart of FIG. 16 are the same as those of FIG. 13, so that the explanation will be omitted.

The exposure conditions are determined by conducting the weighting evaluation (step 40); the camera operation control means (66) calculates area S of the portion recognized as white which is caused when exposure is executed under the above-described exposure condition (step 44); when area S is smaller than the first reference value S1, automatic exposure control is completed, and when $S1 < S < S2$, wherein S1 is the first reference value and S2 is the second reference value, correction is performed in such a manner that the exposure is shifted down by 0.5 EV (step 46); and when area S of the portions recognized as white is larger than the second reference value S2, correction is executed in such a manner that the exposure is shifted down by 1.0 EV (step 47).

After that, the release switch 19 is completely pressed (step 48); exposure is performed (step 49); and the image pick-up signal is recorded 9 (step 50). The concept of the method explained in this example is as follows: the weighting is determined according to the position of the elemental luminance region in the evaluation luminance region, which is the essential concept of the present invention. The essential concept of the present invention will be described later.

EXAMPLE 8

Figure 17:
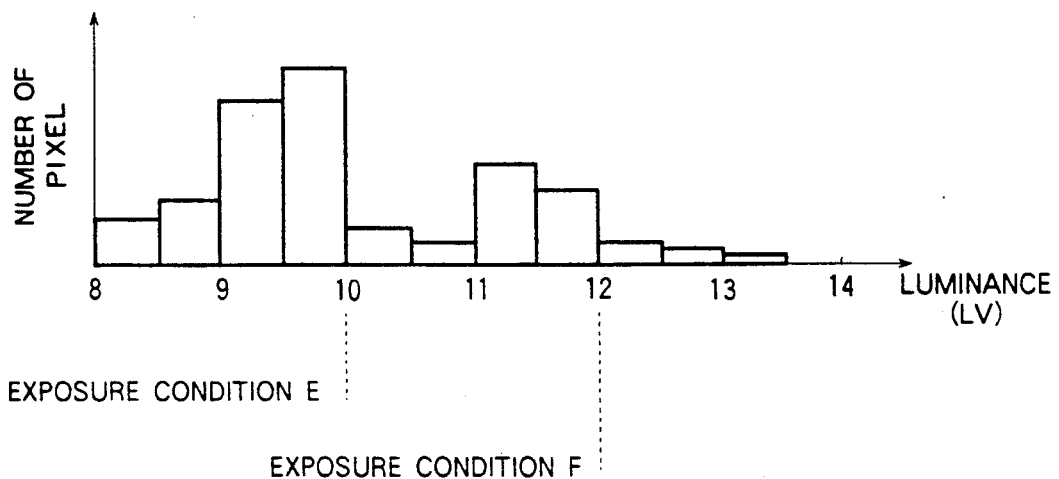
FIG. 17 is a histogram and FIG. 18 is a graph, which explain the setting method of exposure conditions including the knee-point characteristic in the eighth example of the present invention.

Assume the case in which a histogram shown in FIG. 17 has been obtained. In this case, the evaluation value in the luminance range of 8 to 10 Lv becomes the largest, so that photographing is conducted under the exposure condition of E, which is illustrated by a one-dotted chain line in FIG. 18.

However, there are many pixels in the luminance region of 11 to 12 Lv. This luminance region is close to the luminance region of which evaluation luminance is the largest compared with the case shown in FIG. 14. Accordingly, it is desirable not only to reduce the averaged luminance as explained in Example 2 but also to eliminate the portions recognized as white.

Figure 18:
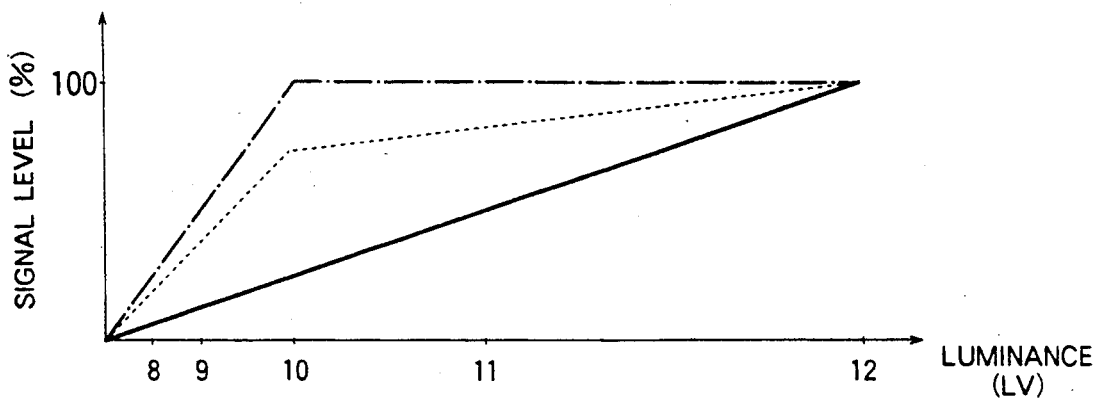

In this case, exposure is performed in accordance with the luminance level of 12 Lv in such a manner as illustrated by a solid line in FIG. 18 so that the gradation of 12 Lv can be expressed. However, when exposure is performed in the way described above, the level of the image pick-up signal of the main photographic object, the luminance of which is in the range of 8 to 10 Lv, is decreased. In order to compensate the decrease in the signal level, the CCD 9 is knee-point-driven so that the characteristic illustrated by a dotted line in FIG. 18 can be realized, the low luminance can be raised, and the high luminance portion can be compressed.

Figure 19:
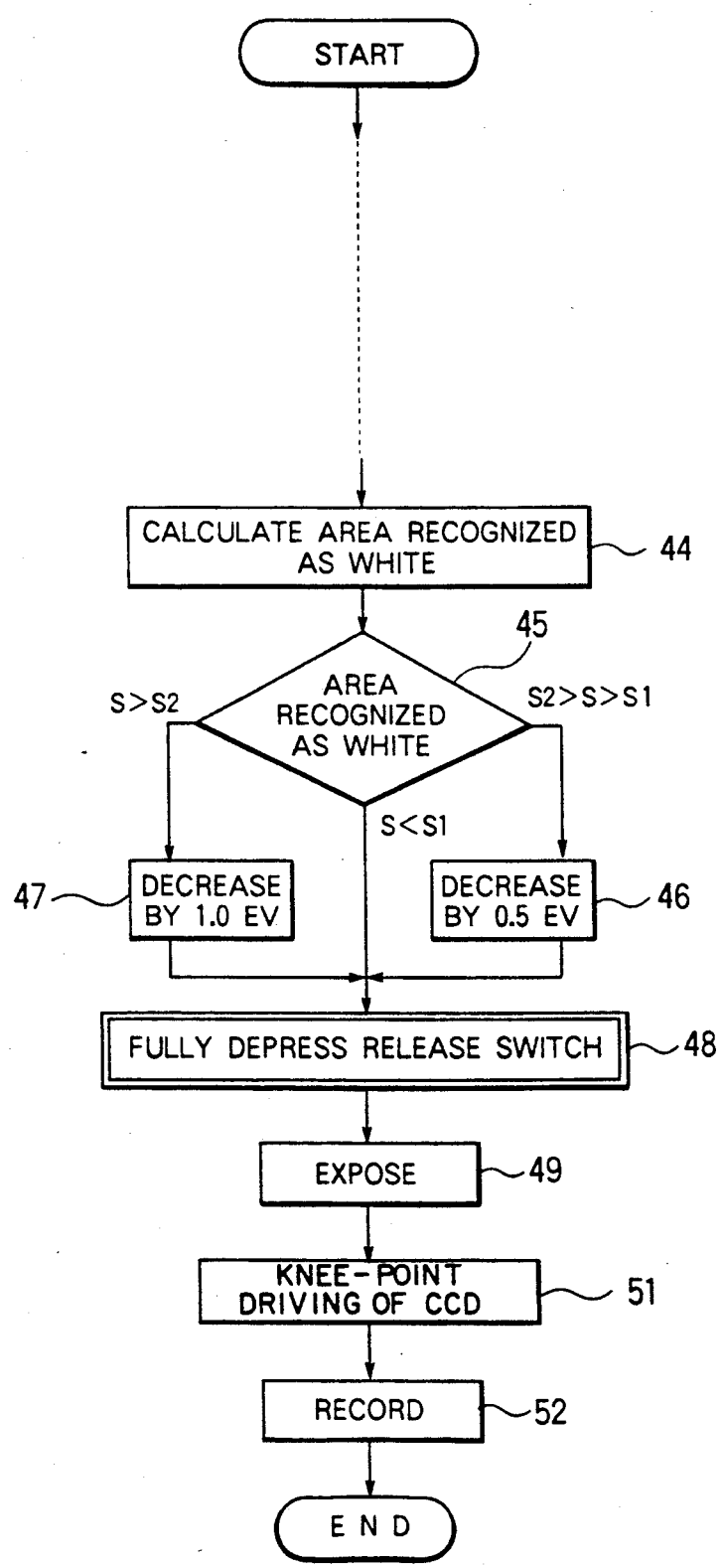
FIG. 19 is a flow chart which explains the procedure in the eighth example.

FIG. 19 is a flow chart which shows the control conducted in the above-described case.

The characteristic of this flow is as follows. The flow chart shown in FIG. 19 is made in such a manner that: step 51 in which the CCD is knee-point-driven has been added to the flow chart shown in FIG. 16, wherein step 51 is added right after step 49 in FIG. 16. Namely, when many pixels have been detected in a high luminance portion apart from the luminance region of which evaluation luminance is the largest, the camera operation control means 66 is operated as follows: it commands the CCD drive control circuit 26 to change over the switch 7 to the terminal b; the output wave form of the knee-point-drive wave form generating circuit 6 is supplied to the CCD drive circuit 8; and the CCD 9 is knee-point-driven so that the characteristic shown by a dotted line illustrated in FIG. 18 can be given. Generally speaking, in the case of knee-point-driving, the time of photoelectric transfer and charging of a CCD is electrically controlled, so that an electrical shutter can be realized and a mechanical shutter can be omitted.

The inventors have already filed various applications relating to knee-point-driving, for example the technology disclosed in the official gazettes of Japanese Patent Application Nos. 289509/1988 and 289506/1988. The technology can be summarized as follows: in FIT-CCD, the capacity of the light receiving portion is made smaller than that of the vertical transmitting portion; electrical charge is read out a plurality of times from the light receiving portion to the vertical transmitting portion; the timing at which the reading-out pulse is supplied to the reading-out gate, is controlled; and in the manner described above, a difference is made between the effective exposure time of the low luminance portion and that of the high luminance portion. In the way explained above, various knee-point-characteristics can be realized.

EXAMPLE 9

Figure 20:
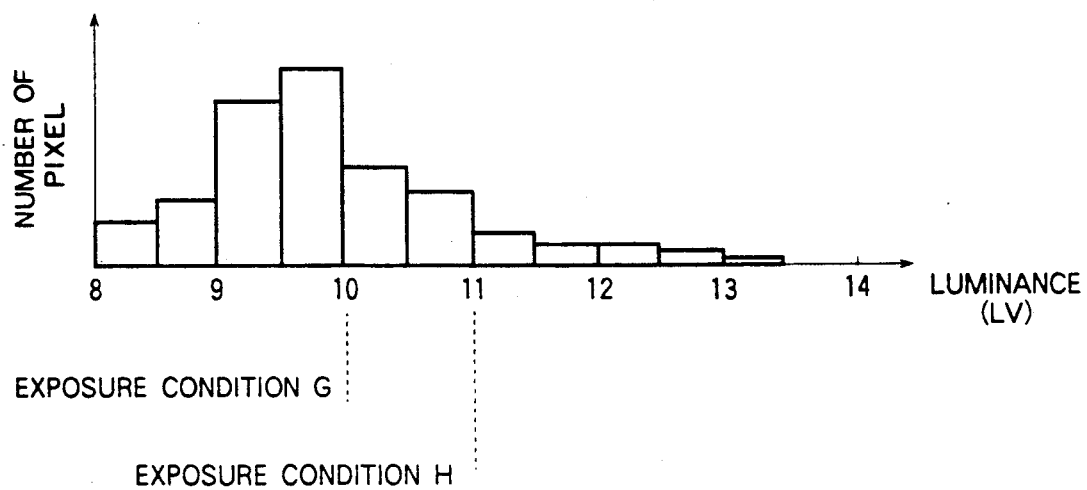
FIG. 20 is a histogram and FIG. 21 is a graph, which explain the setting method of exposure conditions including the knee-point characteristic in the ninth example of the present invention.

When the knee-point characteristic is varied according to the distribution of pixels in the high luminance portion, more desirable images can be obtained. In the case of Example 8 illustrated in FIG. 17, there are many pixels in the luminance range of 11 to 12 Lv, so that the knee-point characteristic is made as illustrated by a dotted line in FIG. 18. In the case of FIG. 20 in which there are many pixels in the luminance range of 10 to 11 Lv and there are few pixels in the luminance range of 11 to 12 Lv, exposure is conducted in such a manner as the solid line illustrated in FIG. 21 and the knee-point characteristic is represented by a dotted line in the drawing, so that the luminance range of 10 to 11 Lv can be relieved and the gradation of the main luminance range of 8 to 10 Lv can be increased.

EXAMPLE 10

Not only the knee-point of the knee-point characteristic but also various depth of the knee-point can be applied to the apparatus of the present invention.

The knee-point characteristic is given as follows. Exposure is performed in accordance with the characteristic f shown in FIG. 22; when the pixels in a high luminance portion are many, the knee-point characteristic is given in accordance with the characteristic g; when the pixels are few, the knee-knee characteristic is given in accordance with the characteristic h; when the number of pixels in the high luminance portion is not more than a predetermined value, the knee-point characteristic is not given as shown by the characteristic i.

Figure 22:
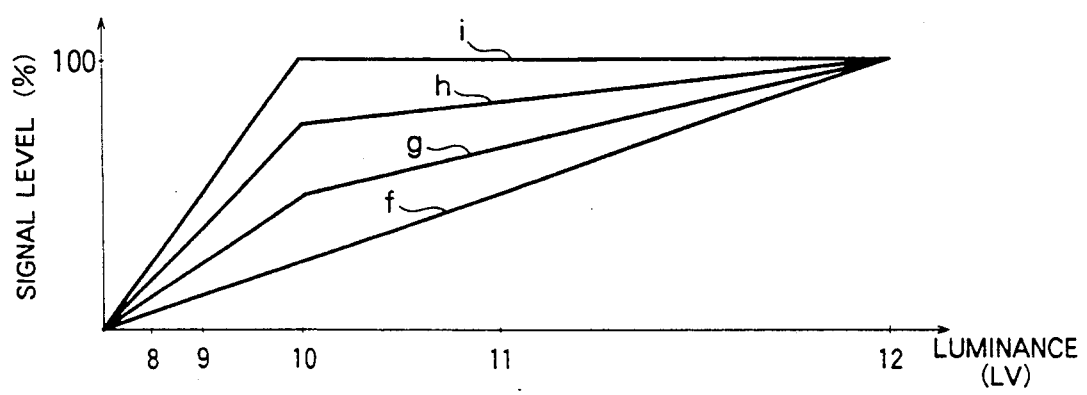
FIG. 22 is a graph which shows the kind of the knee-point characteristic in the tenth example of the present invention.

The knee-point characteristic can be varied according to the number of pixels in a high luminance portion, the luminance of which is higher than that of the knee-point. Namely, when the knee-point characteristic is varied, correction is conducted in such a manner that the above-described exposure is shifted down. For example, even when the characteristic h shown in FIG. 22 is judged to be proper as a result of the weighting evaluation, when the number of pixels in the high luminance portion is more than a predetermined value, the knee-point characteristic is given in accordance with the characteristic g so that the signal level of the main photographic object can be reduced in order to prevent the averaged luminance of the image screen from rising too high.

There are several methods to change the knee-point characteristic according to the circumstances. In the above-described case, after the evaluation values have been calculated, judgement of which knee-point characteristic should be given is conducted independently. However, the judgement can be also conducted only according to the calculation of the evaluation value, which can be realized as follows: several kinds of weighting factors corresponding to various knee-point characteristics are stored in the ROM 28; when the evaluation values are calculated, all kinds of weighting is conducted; and the knee-point characteristic, the evaluation of which is the highest, is realized.

Figure 23:
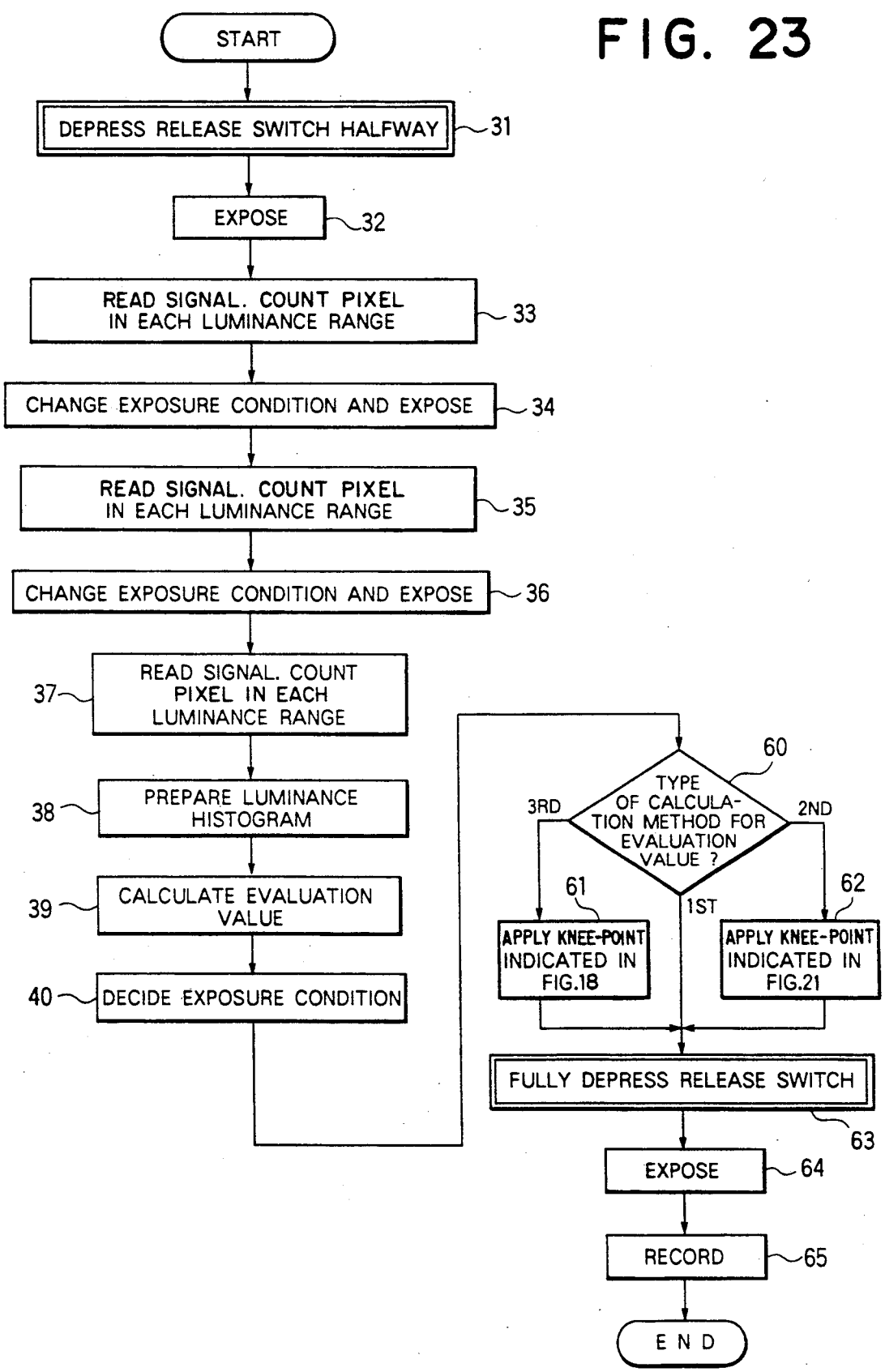
FIG. 23 is a flow chart which explains the procedure in the case of the tenth example in which the kind of knee-point characteristic to be applied is determined only by the computation of the evaluation values.

The control procedure which is executed in the above-described case, is shown in FIG. 23.

In this flow shown in FIG. 23, three types of evaluation values are calculated with regard to each luminance region in step 39, which is the step to calculate the evaluation values. The first type is the evaluation value which has been used for weighting in the above-described range of 2 Lv. The second type is the evaluation value which has been used for weighting in the luminance range of 3 Lv (the weighting factors are ¼, ¼, ¾, ¾, ¼, and ¼ which are aligned in the luminance order). The third type is the evaluation value which has been used for weighting in the luminance range of 4 Lv, and the weighting factors are ¼, ¼, ¼, ¼, ¾, ¾, ½, and ¼ in the luminance order.

Figure 21:
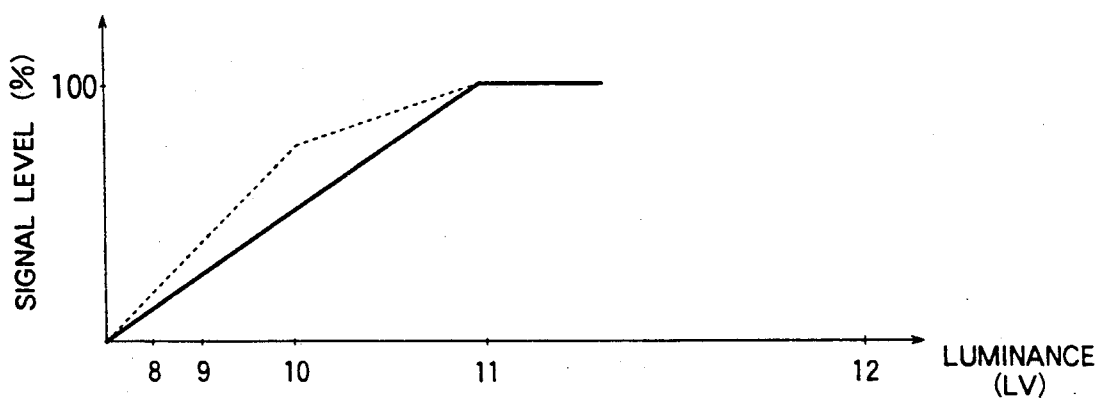

After the exposure conditions are determined (step 40), it is judged that the highest evaluation value has been obtained and by which type of calculation method (step 60). In the case of the first type, the knee-point characteristic is not given and exposure control is performed in accordance with the luminance region. In the case of the second type, the knee-point characteristic is given as illustrated in FIG. 21 (step 62). In the case of the third type, the knee-point characteristic is given as illustrated in FIG. 18. In other words, the exposure control is conducted in step 64. According to this method, it can be judged whether the knee-point characteristic should be given or not, only by calculating the evaluation values and comparing them. The above-described weighting method is a mere example and it should be understood that the present invention is not limited to the specific example.

In the case explained above, in order to obtain the knee-point characteristic, a CCD is used to drive the knee. The following method can be also applied in order to obtain a knee-point characteristic: a CCD is driven by a conventional method and the output signal of the CCD is appropriately processed. In this case, it is not necessary to provide a knee-point driving wave form generating circuit, however it is necessary to provide an electronic shutter. Exposure illustrated by a solid line in FIG. 18 or FIG. 21 is given by the shutter to the CCD.

EXAMPLE 11

In the method described above, when the number of pixels is large on the high luminance side of the evaluation luminance region of the largest evaluation value, exposure is shifted down to the low luminance side or the knee-point characteristic is given. In this case, the high luminance side is defined as the luminance region close to the evaluation luminance side. Accordingly, when it is necessary to utilize the information of an extremely high luminance region or the information about all luminance regions, further study is needed so as to conduct exposure control appropriately.

In this example, the application field of the method explained in Example 10 is extended, wherein the method explained in Example 10 determines appropriate exposure only according to the calculation of evaluation values. In the method of this example, the range of the evaluation luminance region is further extended and the manner of the weighting of each elemental luminance region is changed. The concept of all other examples explained above is included in this example.

In this example, the following four kinds of evaluation methods are adopted.

THE FIRST METHOD

The width of the evaluation luminance region is set to 2 Lv, and larger weighting factors are given to the high luminance side. For example, the weighting is performed with a width of 0.5 Lv in such a manner that the weighting factors are 1, 1, 0.5, 0.5 in the luminance order.

THE SECOND METHOD

The width of the evaluation luminance range is set to 3 Lv, and the weighting is performed in such a manner that the weighting factors are "light", "heavy", and "middle", wherein "light" is assigned to the high luminance side and "middle" is assigned to the low luminance side. For example, the weighting factors are $\frac{1}{4}$, $\frac{1}{4}$, $\frac{3}{4}$, $\frac{3}{4}$, $\frac{1}{2}$, $\frac{1}{2}$ in the luminance order.

THE THIRD METHOD

The width of the evaluation luminance region is set to 2 Lv $+\alpha$. The portion of $\alpha$ represents all the luminance region on the high luminance side, the width of which is more than 2 Lv. For example, the weighting factors are $\frac{1}{4}$ (the portion of $\alpha$), $\frac{3}{4}$, $\frac{3}{4}$, $\frac{1}{2}$, $\frac{1}{2}$ in the luminance order.

THE FOURTH METHOD

The width of the evaluation luminance region is set to 4 Lv, and the weighting factors are $\frac{1}{8}$, $\frac{1}{8}$, $\frac{1}{8}$, $\frac{1}{8}$, $\frac{3}{4}$, $\frac{3}{4}$, $\frac{1}{2}$, $\frac{1}{4}$ in the luminance order, wherein the width is 0.5 Lv.

Every evaluation method has exposure control and signal processing methods corresponding to it. The evaluation luminance region and evaluation method of which evaluation values are the highest, are selected, and exposure control is conducted in accordance with the luminance region and the evaluation method.

In the case in which the selected evaluation value is evaluated by the first method, exposure control is conducted in such a manner that the upper limit of the evaluation luminance region is set a little lower than the saturation of the signal.

NORMAL METHOD

In the case in which the evaluation value is selected by the second method, exposure control is conducted in such a manner that the upper limit of the luminance region is set a little lower than the signal saturation. In this case, the knee-point characteristic is given by the method of a CCD drive or signal processing so that the signal in the range of 2 Lv on the lower side can be raised and the signal in the range of 1 Lv on the upper side can be compressed (which is shown in FIG. 21).

In the case in which the evaluation value is selected by the third evaluation method, exposure control is conducted in such a manner that the exposure is shifted down by 1 Lv. When the evaluation value by this method is higher than those by the second and fourth methods, there are many pixels on the higher luminance side than the main photographic object, and further the pixels are distributed in the luminance region higher than the luminance of the main photographic object. Therefore, it is difficult to make an image signal from the luminance information of the pixels by preventing the occurrence of the portions recognized as white by the method of giving a knee-point characteristic. Therefore, exposure is controlled in such a manner that the luminance is shifted down by 1 Ev so that the averaged luminance of the image can be lowered.

In the case in which the evaluation value is selected by the third method, the range of 2 Lv on the high luminance side is compressed in the same manner as the evaluation value selected by the second method.

The knee-point in the case in which the evaluation value has been selected by the second method, is different from that in the case in which the evaluation value has been selected by the fourth method. In order to give various variations to the knee-point, the following method is used: the weighting factors are changed in the second and fourth methods; or the evaluation method in which $+\alpha$, the sum of the number of pixels on the high luminance side, is added.

Referring now to the drawings, the examples of the exposure correction mechanism of the present invention will be explained as follows.

EXAMPLE 12

Figure 24:
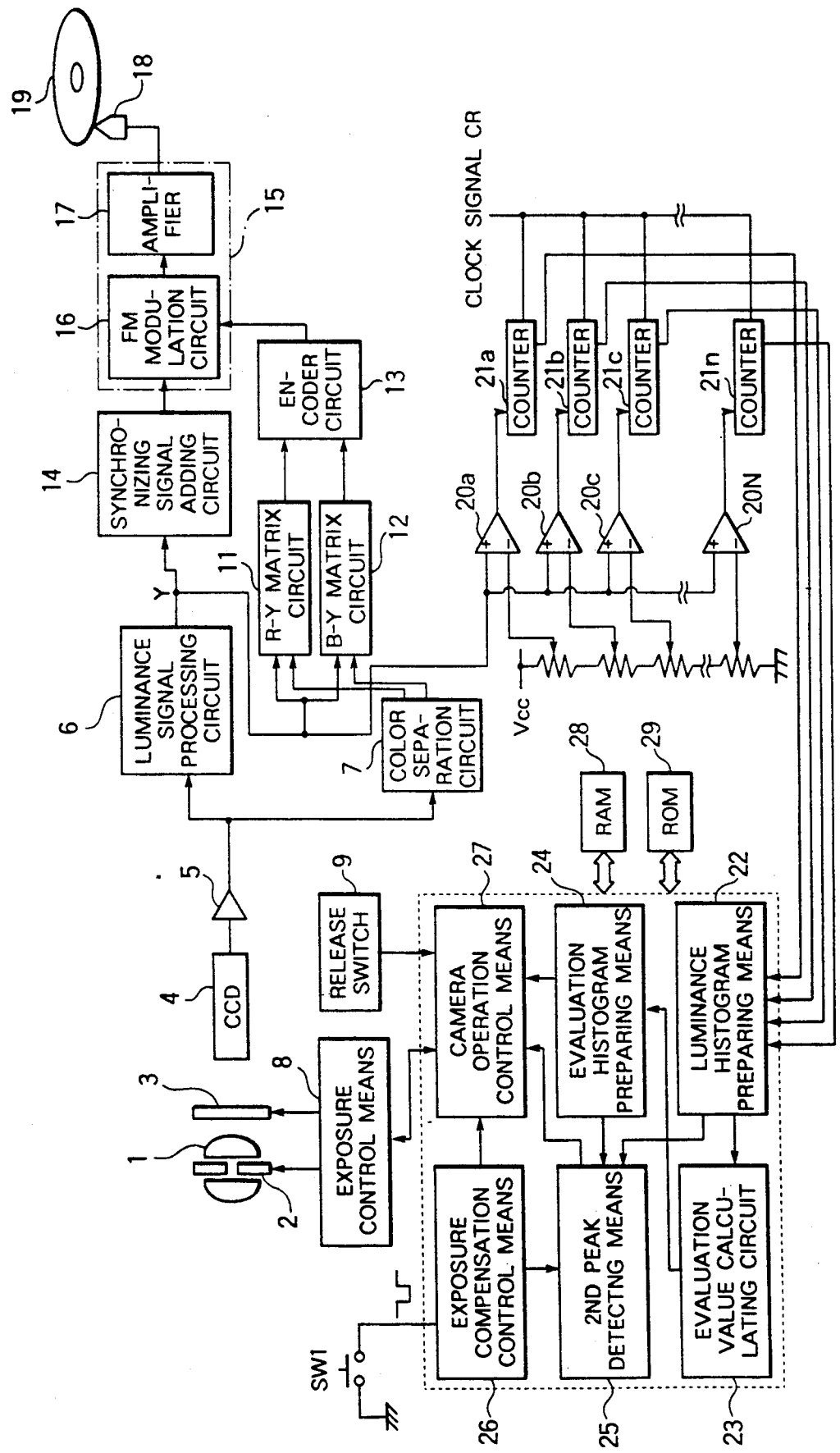
FIG. 24 is a flow chart which shows the whole composition of the exposure correction mechanism of a camera of the present invention, wherein the exposure correction mechanism is explained in the twelfth, thirteenth and fourteenth examples.

FIG. 24 is a block diagram of an example of the exposure correction mechanism of the present invention. (This drawing will be used when Example 13 and Example 14 are explained.)

COMPOSITION

The iris mechanism 2 and shutter 3, the function of which is to adjust the exposure, are provided to positions close to the lens system 1. They are driven by the exposure control means 8.

The exposure control means 8 is controlled by the CPU 10, and the operation of the whole camera is also controlled by the CPU 10.

The function blocks (which is a means to realize a predetermined function in such a manner that hardware is driven by software) of the CPU 10 comprises: the luminance histogram making means 22; the evaluation value calculating means 23; the evaluation histogram making means 24; the second peak detecting means 25; the exposure correction control means 26; and the camera operation control means 27 which controls the operations of measuring a distance, metering and photographing.

The exposure correction control means 26 is operated as follows: when exposure correction switch SW1 is pressed by a photographer and a minus pulse is inputted into the exposure correction control means 26, the exposure correction control means 26 commands the second peak detecting means 25 so that the second peak in the luminance histogram (or the evaluation histogram) can be detected; and the exposure correction control means 26 commands the camera operation control means 27 so that the exposure operation can be conducted in accordance with the second peak.

Figure 25:
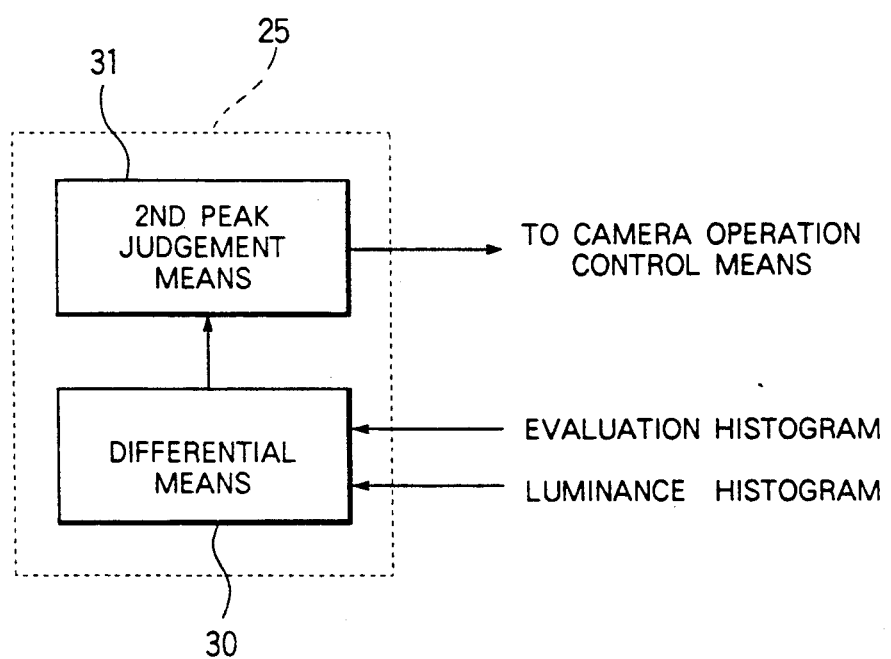
FIG. 25 is a schematic illustration which shows a specific composition (functional block composition) of the second peak detection means in the twelfth example.

In this example, the function blocks of the second peak detection means 25 are shown in FIG. 25. The second peak detection means is operated as follows: the curve of the luminance histogram (or the evaluation histogram) is differentiated by the differentiation means so that the position of a peak can be detected; and the absolute values of the histogram are compared by the second peak judging means 31, and the region of the second peak is judged.

The camera operation control means 27 commands the exposure control means 8 to adjust the exposure; and when the release switch 9 is completely pressed, photographing is conducted. The operation of these blocks is executed utilizing the RAM 28 and RAM 29.

The CCD (the image sensor) 4 converts an optical signal on the image screen into an electrical signal, and the output signal of the CCD 4 is amplified by the amplifier 5 and inputted into the luminance signal processing circuit 6 and the color separation circuit 7.

The luminance signal processing circuit 6 generates luminance signal (Y), and the color separation circuit 7 separates color signals. The color difference signals outputted from the matrix circuits 11, 12 are encoded by the encoder circuit 13 and inputted into the recording circuit 15. A synchronizing signal sent from the synchronizing signal adding circuit 14 is added to luminance signal (Y) which is outputted from the luminance signal processing circuit 6, and then luminance signal (Y) is inputted into the recording circuit 15.

The recording circuit 15 is provided with the FM modulation circuit 16 and the amplifier 17. The output of the amplifier 17 is recorded in the floppy disk 19 through the recording head 18.

When an automatic exposure control is conducted, luminance signal (Y) is inputted into a counting means which counts the number of pixels in each luminance, wherein the counting means is composed of a plurality of comparators 20a to 20n and the counters 21a to 21n. The voltage obtained by dividing power source voltage Vcc with resistance is inputted into the reverse terminals of the comparators 22a to 22n, wherein the difference between the values of divided voltage is corresponding to the difference 0.5 Lv between the values of luminance. Clock signal CR is commonly inputted into the counter circuits 23a to 23n. Each counter circuit counts clock signal CR while the outputs of the comparators 22a to 22n are on a high level, in other words, while the outputs of the comparators 22a to 22n exceed the lower limit of each luminance region. In the case of a still video camera, the scanning time of an image screen is 1/60 sec, so that when the image screen is divided into about 60,000, the frequency of clock signal CR is estimated at 3.8 MHz.

The counted values of the counters 21a to 21n are inputted into the luminance histogram making means 22 provided in the above-described CPU 10. The luminance histogram making means 22 makes luminance histograms of the image screen according to the counted values, and sends the information to the evaluation value calculating means 23.

The evaluation value calculating means 23 adds the number of pixels by the width of 2 Lv, for example, within the luminance range in which the pixel information has been obtained. The evaluation histogram making means 24 makes a histogram according to the calculated evaluation value and sends the information to the camera operation control means 27.

In the case of a normal AE mode, the camera operation control means 27 recognizes the luminance region of which evaluation is the highest, and controls the exposure so that the image pick-up signal of this luminance region can be on the most proper level. In the case of the exposure correction mode in which exposure correction switch SW1 is pressed, the luminance range of which evaluation is the highest, is neglected and exposure control is carried out in accordance with the second highest, or lower, luminance region.

METERING SYSTEM ADOPTED IN THIS EXAMPLE

The overall averaged metering system and center priority metering system are generally used. The former is the system in which the luminance values of the entire the image screen are averaged, and the latter is the system in which the luminance values are averaged while the priority is given to the center of the image screen. In the case of the metering adopted in this example, the luminance values are not averaged, so that it does not correspond to any of them. In the case of this example, the mode of the luminance value of each pixel is found and the averaged value is not found. In the former metering system, all pixels are given the same weighting when the number of pixels is counted, and in the latter metering system, the pixels located in the central portion of the image screen are given a higher weighting factor than the pixels located in the peripheral portions. In the case of the metering system of this example, the weighting can be simply conducted, so that the characteristic of AE can be easily grasped by a photographer in the same way as the overall averaged metering system and the center priority averaged metering system. In other words, the photographer can easily judge the case in which exposure control is not conducted appropriately.

EXAMPLE OF EXPOSURE CORRECTION IN THIS EXAMPLE

Assume that a photograph of a man and landscape is taken, wherein the man is standing against the background of the setting sun. In this case, the man occupies most of the image screen, so that the main photographic object is the man. Assume that the setting sun is small in the image screen.

First of all, the photographer presses the release switch 9 a little for distance measuring and photometry (AE). In this case, the camera operation control means 27 controls the exposure in accordance with the luminance region of the man, in which the evaluation value becomes the highest. Next, the release switch 9 is completely pressed in order to take a photograph of which the main object is the man.

Then, the photographer judges the photographing condition in order to take a photograph of the setting sun so that the exposure is determined in accordance with the sun. In this case, the main photographic object is the red setting sun, so that there will be caused no problem even though other objects become silhouetted. It can be easily judged that: the setting sun is small in the image screen, so that the exposure can not be appropriately controlled in the case of normal photographing. In this case, the measure of bracketing is not effective because the chance of failure is high.

Accordingly, exposure correction is conducted in this case.

Figure 26:
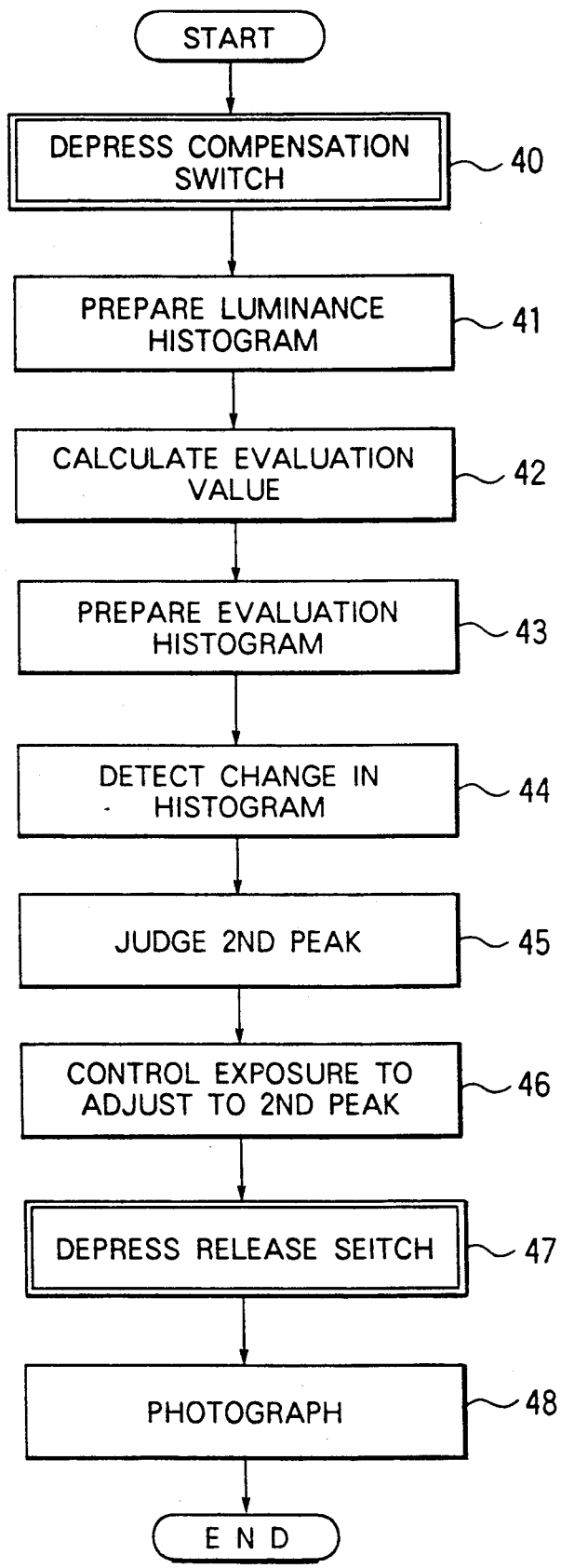
FIG. 26 is a flow chart which shows the procedure of exposure correction in the twelfth example.

FIG. 26 is a flow chart to explain the procedure of exposure correction. In the flow chart, the blocks which show the operation conducted by a photographer are surrounded by a double line in order to distinguish from the operation of the camera itself.

First of all, the photographer presses exposure correction switch SW1 in order to command the camera to conduct exposure correction (step 40). The camera performs a plurality times of exposures under various exposure conditions so that the luminance information of the image screen can be obtained; a luminance histogram is made according to the obtained information (step 41); the number of pixels is added by the range of 2 Lv so that the evaluation value is calculated (step 42); and the evaluation histogram is made(step 42).

The differentiation means 30 in the second peak detection means 25, which is started by the exposure correction control means 26, differentiates the curve of the evaluation histogram (or the luminance histogram) so that the peak on the curve can be detected (step 44); and the second peak judging means 31 compares the peak values in order to judge the second highest peak (the sub-peak) (step 45). In this case the highest peak (the main peak) is neglected. Next, the camera operation control means 27 controls the exposure in accordance with the detected second peak (step 46).

When the photographer presses the release switch 9 completely (step 47), photographing is conducted and the image pick-up signals are recorded in the floppy 19 (step 19).

As explained above, when the photographer determines to conduct exposure correction, the amount of correction is automatically set to an appropriate value, so that the operation is simple and failure can be avoided.

EXAMPLE 13

Figure 27:
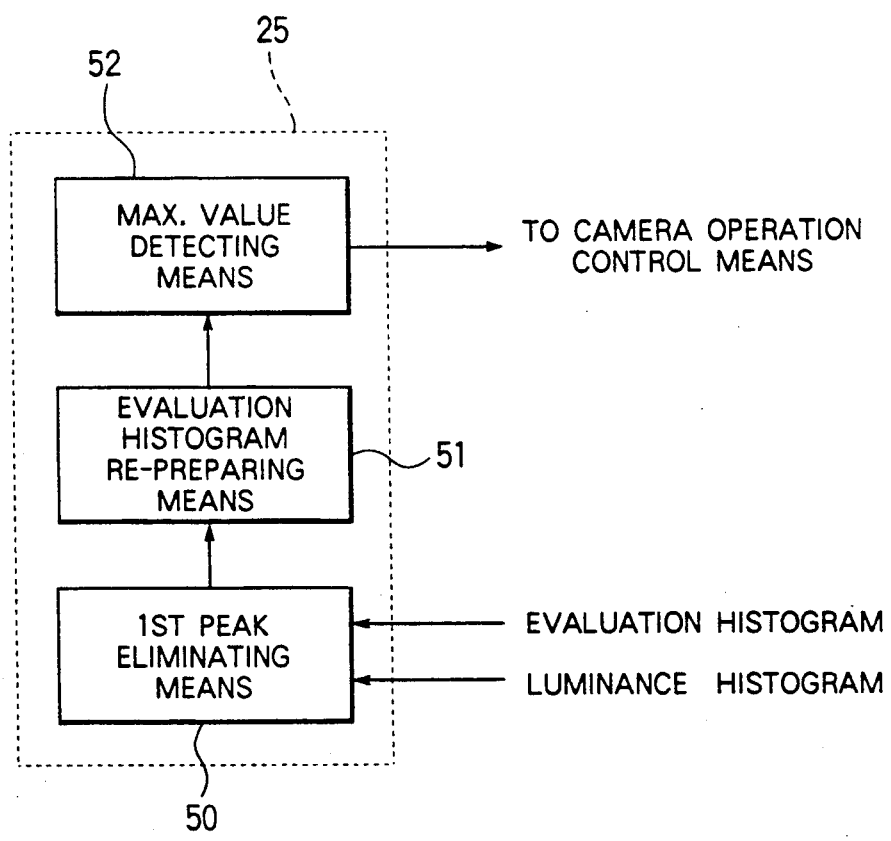
FIG. 27 is a schematic illustration which shows a specific composition (functional block composition) of the second peak detection means 25 in the thirteenth example.

In this example, the function block of the second peak detection means 25 is composed in such a manner as shown in FIG. 27. Specifically, the function block is composed of the first peak elimination means 50, the evaluation histogram re-making means 51, and the maximum value detection means 52.

In this example, the second peak is judged as follows: the evaluation values are found from the luminance histogram; an evaluation histogram is made according to the found evaluation values; the luminance histogram value of the luminance region is set to zero, wherein the signal level of the luminance region becomes proper when photographing is conducted in accordance with the luminance region (the first peak) of which evaluation is the highest; the evaluation values are calculated again from this luminance histogram and an evaluation histogram is made; and the largest value of this evaluation histogram is judged to be the second peak.

EXAMPLE OF DETECTION OF THE SECOND PEAK

Figure 28:
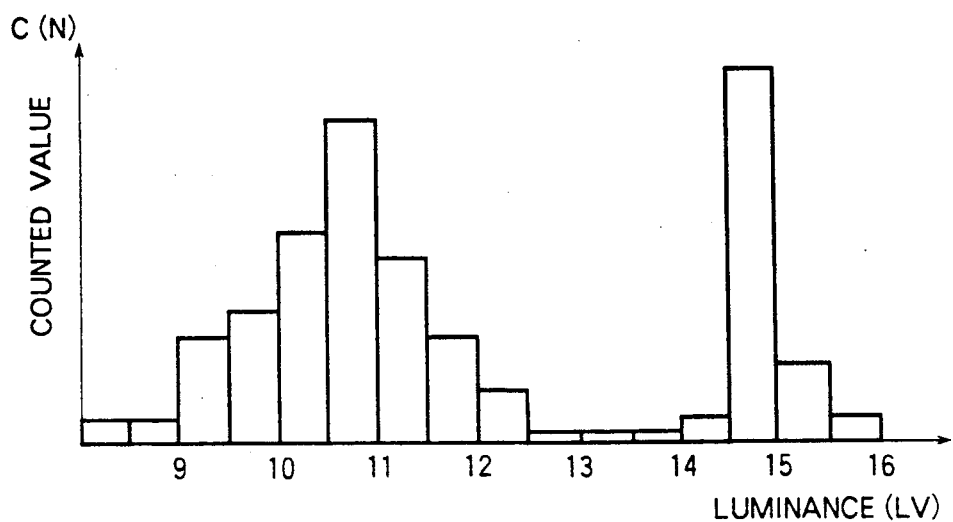
Figure 28:
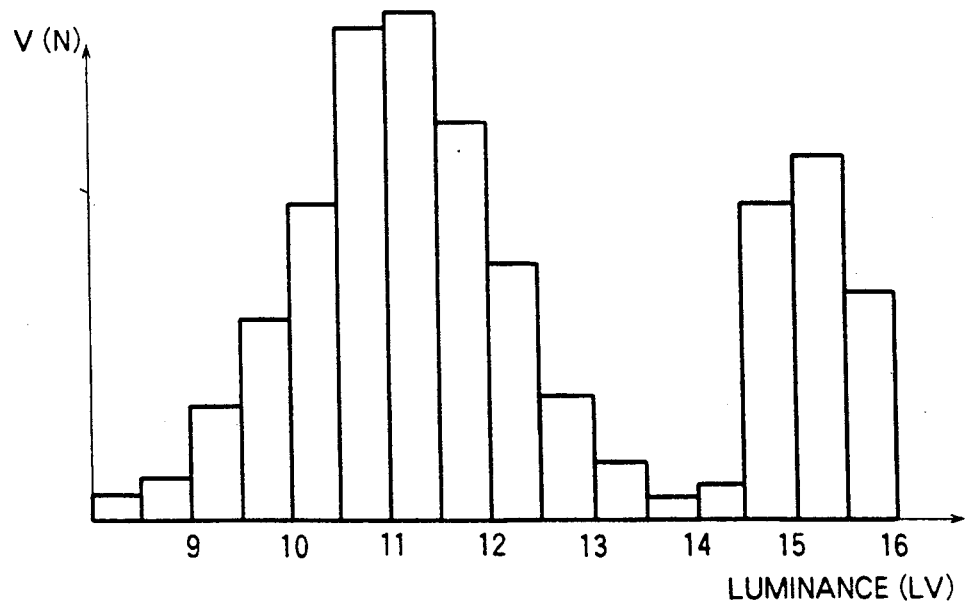
Figure 28:
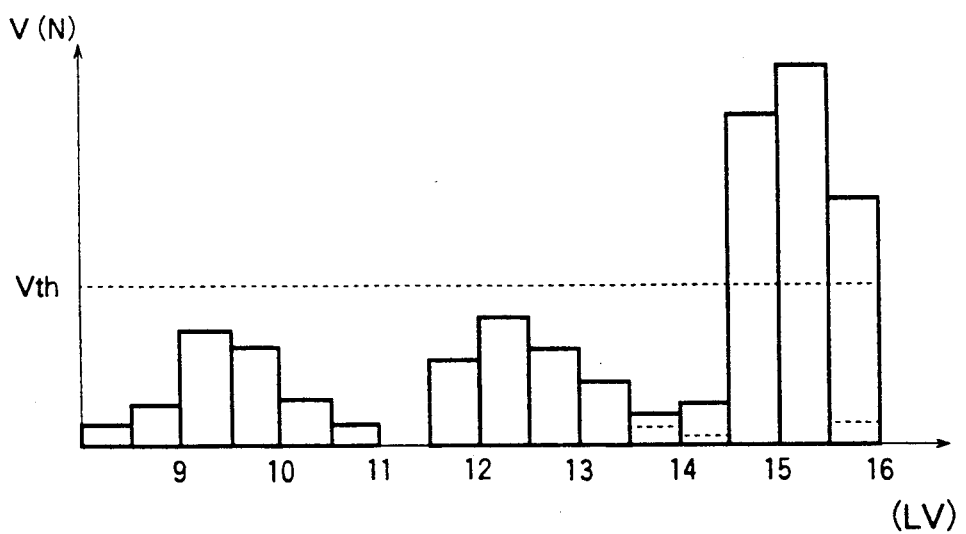

Assume that: the number of pixels in each luminance region on the image screen has been counted in the photographing conducted a plurality of times; and the histogram illustrated in FIG. 28(a) has been obtained.

The evaluation histogram shown in FIG. 28(b) is obtained in such a manner that: the luminance histogram values are added within the range of 2 Lv so that the evaluation values are calculated; and the evaluation histogram is made.

The maximum value of this evaluation histogram is 11.5 Lv. When the exposure is adjusted to this luminance value and photographing is conducted, the level of the image pick-up signal becomes the most proper in the range of 11.5 Lv to 9.5 Lv. In other words, this luminance range is the portion corresponding to the main photographic object. To be more concrete, this luminance range is the first peak.

The evaluation histogram shown in FIG. 28(c) is made as follows: the first peak elimination means 50 executes the processing of making the values in the luminance region of 11.5 Lv to 9.5 Lv zero in the luminance histogram illustrated in FIG. 28(a); the evaluation histogram re-making means 51 adds the luminance histogram values which have been processed, within the range of 2 Ev so that the evaluation values are calculated; and the evaluation histogram is made.

The maximum value detection means 52 judges the second peak as follows: the values of the evaluation histogram which has been made again, are compared with a predetermined threshold value Vth (which is stored in ROM 29); the evaluation histogram values fluctuate around the threshold value and the evaluation histogram values which exceed the threshold value are judged so that the maximum value can be detected; and the luminance region (15.5 Lv) of this maximum value is judged to be the second peak. In the manner explained above, the second peak in the luminance histogram of FIG. 28(a) is detected, and exposure control is conducted in accordance with 15.5 Lv. Exposure correction is carried out in the manner described above.

Figure 29:
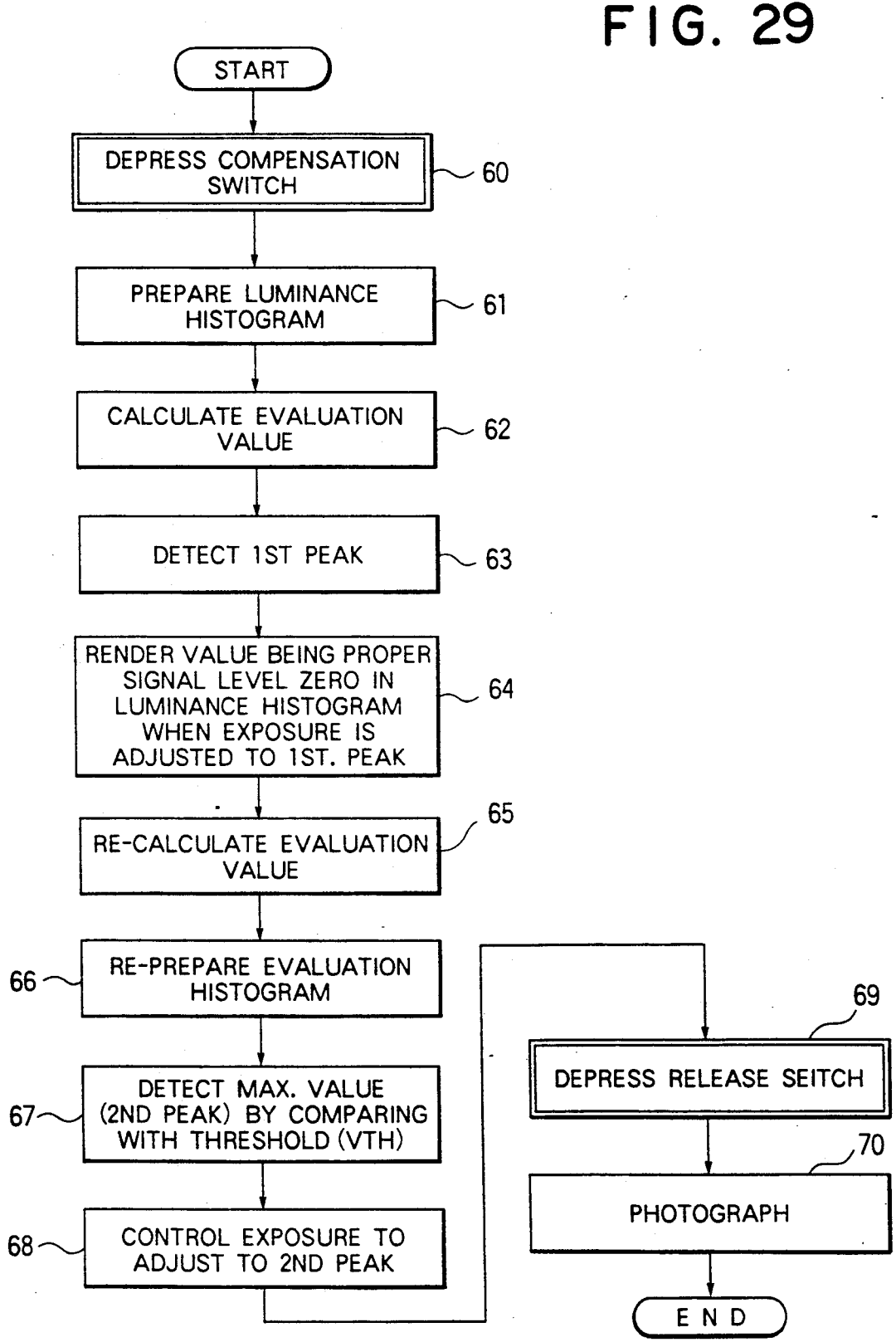
FIG. 29 is a flow chart which explains the procedure of exposure correction in the thirteenth example.

FIG. 29 is a flow chart which explains the auxiliary exposure correction of this example.

The auxiliary exposure correction is performed as follows.

When a photographer presses correction switch SW1 (step 60); a luminance histogram is made according to the obtained luminance information (step 61); the evaluation values are calculated (step 62); and the first peak is detected by detecting the maximum evaluation value (step 63).

Next, the value of the luminance region, the signal level of which becomes proper when the exposure is adjusted to the first peak, is made zero in the luminance histogram (step 64); the evaluation values are calculated again (step 65); and the evaluation histogram is made again (step 66). Then, the evaluation values are compared with the threshold value Vth in order to detect the maximum value, and the second peak is judged according to the maximum value (step 67). Next, the camera operation control means 27 executes exposure control in accordance with the second peak (step 68).

When the photographer presses the release switch 9 completely (step 69), photographing is conducted (step 70).

In the method described above, the first peak elimination means is very simple because the first peak elimination means only makes the values of the luminance histogram (which is not the evaluation histogram) corresponding to the evaluation histogram zero. The evaluation histogram re-making means and the maximum value detection means are the same as the evaluation histogram making means and the maximum value detection means which are used in a normal operation, so that it is not necessary to newly provide them. In other words, the same sub-routine can be repeatedly used in the software.

Accordingly, the composition of the apparatus can be made simplified (in the case of soft ware, a long program is not necessary and the memory capacity can be reduced.

When the luminance region of which the evaluation value is the largest, is close to the luminance region of which the evaluation value is the second largest, the two peaks can not be distinguished from each other in some cases. In this case, it is not possible to detect the luminance region by the peak search method. However, it is possible to detect the luminance region by the method of this example.

EXAMPLE 14

In the example explained above, exposure correction is performed in such a manner that the exposure is adjusted to the photographic object which is located in the second peak position in the luminance histogram. However, it should be understood that the present invention is not limited to the specific example. Even when the photographic object is located in the third or fourth peak, the exposure can be adjusted to the peak in the same way as explained above. In this case, the following composition may be adopted: a plurality of exposure correction switches are provided so that a desirable peak can be selected; or when the exposure correction switch is pressed a plurality of times, the peak to which the exposure is to be adjusted, is changed over in turn. In the case where the first peak is high and the subsequent peaks are low, it is difficult to determine the order of the peaks. In this case, the following method is effective: exposure control is performed in accordance with one of the peaks which are lower than the first peak, and photographing is conducted; and then bracketing is executed.

As explained above, the present invention is advantageous in that:

(1) In the method of the present invention, the conventional concept that the histogram of pixel distribution is made over the entire luminance range, is avoided, so that the information of all luminance ranges is not necessarily needed. If the number of the pixels of which luminance information is not obtained, does not exceed a predetermined level and a histogram of a predetermined level can be made, the metering time can be reduced by adopting a new metering system in which exposure is sufficiently conducted, while the accuracy of the luminance histogram is maintained.

(2) The composition of the exposure control mechanism of the present invention is as follows: photographing is conducted a plurality of times under various conditions; a luminance histogram is made from the image pick-up signals for metering; the first exposure is conducted in accordance with the middle luminance range in the AE range; and the second exposure condition is determined according to the results. Therefore, in most cases, the metering can be completed by conducting the metering twice. Accordingly, the responsibility of the camera can be improved while the accuracy of exposure control is maintained.

(3) The information about the luminance of the image screen is obtained from the sensors which are used for other purposes, and the first exposure condition is determined according to the information. Accordingly, there is a high possibility that the metering is completed by conducting the exposure once, and at the worst, the metering can be completed by conducting the exposure twice, so that the responsibility of the camera can be improved while the accuracy of exposure control is maintained.

(4) According to the effects described above, it is possible to provide a camera by which photographic opportunities are not missed and a clear photographic image can be obtained.

(5) The concept of weighting has been introduced, and the weighting is changed according to which luminance region in the evaluation luminance range the pixels exist, so that the reliability of the evaluation value can be improved.

(6) After the luminance region of the maximum evaluation has been found, the area of the portions recognized as white when photographing is conducted in accordance with the luminance region, is calculated. In the case where the calculated area is larger than a predetermined value, the exposure is corrected in such a manner that the exposure is shifted down. Accordingly, the averaged luminance can be reduced over the entire image screen, so that consideration is given not only to the luminance level of the photographic object but also the luminance level of the background. Therefore, excellent images can be obtained as a whole.

(7) Consideration is given to the information of the luminance region apart from the luminance region of the maximum evaluation, in other words the information of the number of pixels on the high luminance side, the knee-point characteristic is given to the image sensors so that the gain of the low luminance portion can be raised and the high luminance portion can be recorded, being compressed. Accordingly, the whole gradation is well balanced and the main photographic object can be represented by a proper level of luminance.

(8) Due to the synergetic effects described above (5) to (7), the function of a camera can be improved.

(9) The exposure correction mechanism by which the most proper exposure can be automatically set, can be realized, so that the following effects can be obtained.

(10) The procedure to correct the exposure can be simplified, so that a special photographing can be easily performed.

(11) The most proper exposure can be always obtained, so that failure in photographing can be eliminated.

(12) Due to the synergetic effects described above (9) to (11), the function of a camera can be improved.

What is claimed is:

1. An exposure control mechanism for a camera, comprising:
    (a) an image sensor which outputs a luminance signal having a signal level and comprising pixels each having a luminance value within one of a plurality of sequential elemental luminance regions, a plurality of said elemental luminance regions adjacent to each other comprising an evaluation region;
    (b) an exposure regulating means for regulating the exposure of said sensor;
    (c) a driving means for driving said exposure regulating means;
    (d) a luminance information obtaining means for obtaining luminance information from said luminance signal outputted from said image sensor, said luminance information obtaining means firstly counting the number of pixels within each elemental luminance region, secondly obtaining an evaluation value of each said evaluation region by multiplying the number of said pixels belonging to an evaluation region by a weighting value in accordance with the sequential position of said elemental luminance region in said evaluation region, and finally for outputting said obtained evaluation values;
    (e) an exposure control means for controlling said driving means to provide an exposure condition in which said signal level is maximized at the highest value of luminance of said evaluation region in which said evaluation value is maximum; and
    wherein, within a given one of said evaluation regions, the number of pixels within an elemental luminance region containing pixels with a higher luminance value is multiplied by a larger weighted value than is the number of pixels within an elemental luminance region containing pixels with a lower luminance value, and said evaluation value is computed by totaling the number of said pixels in each said elemental luminance region multiplied by said weighted value.

2. The exposure control mechanism of claim 1, wherein when the total number of said pixels having a higher luminance value than the pixels in the evaluation region having said maximum evaluation value is more than a predetermined value, exposure is conducted by said exposure control means so that said exposure condition is altered so that said signal level is maximized at a higher luminance value than said maximum evaluation region.

3. The exposure control mechanism of claim 1, wherein when the number of said pixels in an elemental luminance value region containing pixels with a higher luminance than that of the pixels in said evaluation region having said maximum evaluation value is more than a predetermined value, exposure is conducted by said exposure control means so that said signal level is maximized at the highest value of said higher elemental luminance region, and luminance signal level output by said image sensor includes a knee-point characteristic having a peak at the highest luminance value of said evaluation region in which said evaluation value is maximum so that the low luminance portion of said signal is raised and the high luminance portion is compressed.

4. The exposure control mechanism of claim 3, further comprising an image sensor control means for controlling the operation of said image sensor.

5. A method for controlling camera exposure, comprising the steps of:
    sensing an image;
    producing a luminance signal from said image having a signal level and comprising pixels each having a luminance value within one of a plurality of sequential elemental luminance regions, a plurality of said luminance regions adjacent to each other comprising an evaluation region;
    counting said pixels within each said elemental luminance region;
    multiplying the number of said pixels within each evaluation region by a weighting value in accordance with the sequential position of said elemental luminance region within said evaluation region to obtain an evaluation value;
    controlling said step of sensing an image to provide an exposure condition in which said luminance signal level is maximized at the highest value of said evaluation region in which said evaluation value is maximum; and
    wherein the step of multiplying includes, within a given one of the evaluation regions, multiplying the number of pixels within an elemental luminance region containing pixels with a higher luminance value by a larger weighted value than is the number of pixels within an elemental luminance region containing pixels with a lower luminance value, and totaling the number of pixels in each elemental luminance region multiplied by the weighted value to obtain the evaluation value.

* * * * *